(12) United States Patent
Matsuzawa et al.

(10) Patent No.: US 8,281,105 B2
(45) Date of Patent: Oct. 2, 2012

(54) I/O CONVERSION METHOD AND APPARATUS FOR STORAGE SYSTEM

(75) Inventors: Keiichi Matsuzawa, Arlington, MA (US); Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 442 days.

(21) Appl. No.: 12/690,404

(22) Filed: Jan. 20, 2010

(65) Prior Publication Data

US 2011/0179250 A1 Jul. 21, 2011

(51) Int. Cl.
*G06F 12/00* (2006.01)
(52) U.S. Cl. .......................................... 711/206; 711/208
(58) Field of Classification Search .................. 711/206, 711/208
See application file for complete search history.

(56) References Cited

U.S. PATENT DOCUMENTS

| | | | |
|---|---|---|---|
| 6,725,328 B2 | 4/2004 | Kano et al. | |
| 7,330,950 B2 | 2/2008 | Matsunami et al. | |
| 2005/0086450 A1* | 4/2005 | Shiota | 711/207 |
| 2007/0055713 A1 | 3/2007 | Nagai et al. | |
| 2007/0192560 A1 | 8/2007 | Furuhashi | |
| 2009/0132619 A1 | 5/2009 | Arakawa et al. | |

* cited by examiner

*Primary Examiner* — Reba I Elmore
(74) *Attorney, Agent, or Firm* — Mattingly & Malur, PC

(57) ABSTRACT

A storage system comprises a storage apparatus which includes a processor, storage disks, and a memory storing a page mapping table, a page mapping program, and a page-filename mapping program. A file system manages a file tree of files with filenames. The page mapping table specifies a relationship between data volumes in the storage apparatus and the storage disks and the file system, the data volumes each including pages, each page including segments, each segment including sectors. The file tree has for each storage apparatus a hierarchy of directories and files based on relationships among the data volumes, the pages, and the segments. The page mapping program and the page-filename mapping program are executable by the processor to specify, by page, a location of data contained in the I/O request by referring to the page mapping table and the file tree.

20 Claims, 29 Drawing Sheets

Fig. 2

PAGE MAPPING TABLE 200

| Volume ID 210 | Page Offset 220 | Length 230 | Node ID 240 | Disk ID 250 | Disk Offset 260 |
|---|---|---|---|---|---|
| vol1 | 0 | 100 | internal | 1 | 50 |
| vol1 | 100 | 10 | node1 | | |
| vol1 | 110 | 30 | internal | 2 | 100 |
| vol2 | 0 | 5 | node1 | | |

Fig. 6

PAGE MAPPING TABLE 600

| Volume ID | Page Offset | Length | Node ID | Disk ID | Disk Offset |
|---|---|---|---|---|---|
| vol1 | 0 | 55 | | 1 | 50 |
| vol1 | 55 | 5 | node1 | | |
| vol1 | 60 | 40 | | 1 | 110 |
| vol1 | 100 | 5 | node1 | | |
| vol1 | 105 | 5 | | 1 | 150 |
| vol1 | 110 | 30 | | 2 | 100 |
| vol2 | 0 | 5 | node1 | | |

670 671 672 673 674 272 273

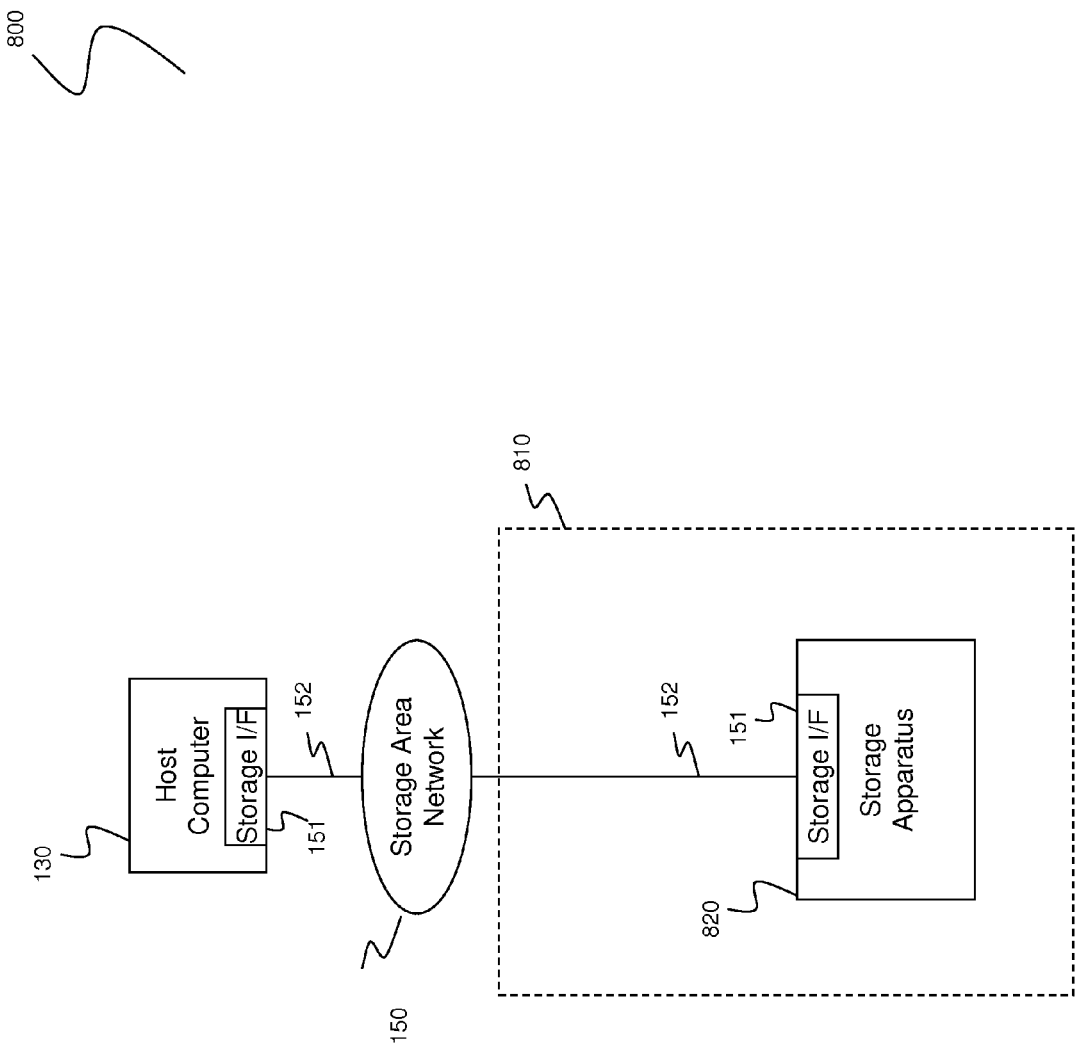

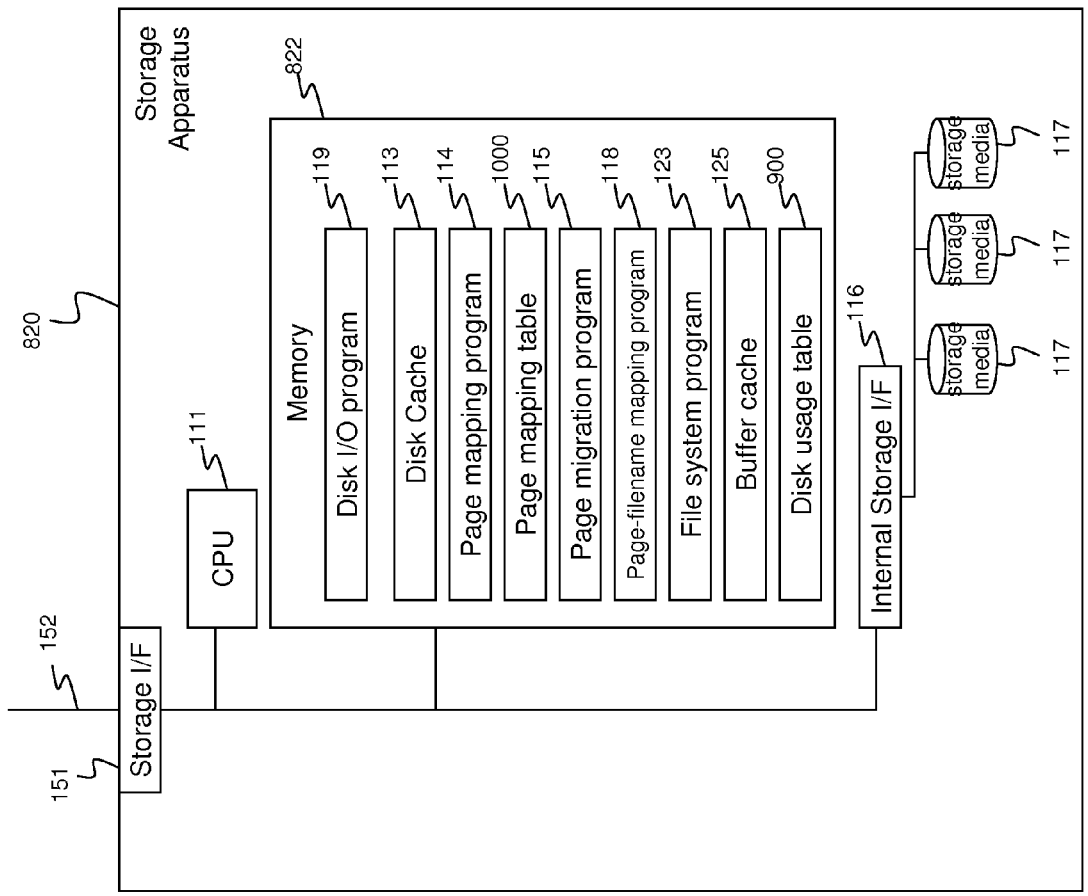

DISK USAGE TABLE

| Disk ID | For host | For file service |
|---|---|---|
| 1 | yes | |
| 2 | yes | yes |
| 3 | | yes |
| 4 | | yes |

Fig. 10

PAGE MAPPING TABLE 1000

1010

| Volume ID | Page Offset | Length | In file | Disk ID | Disk Offset |
|---|---|---|---|---|---|
| vol1 | 0 | 100 | no | 1 | 50 |
| vol1 | 100 | 10 | yes | | |
| vol1 | 110 | 30 | no | 2 | 100 |
| vol2 | 0 | 5 | yes | | |

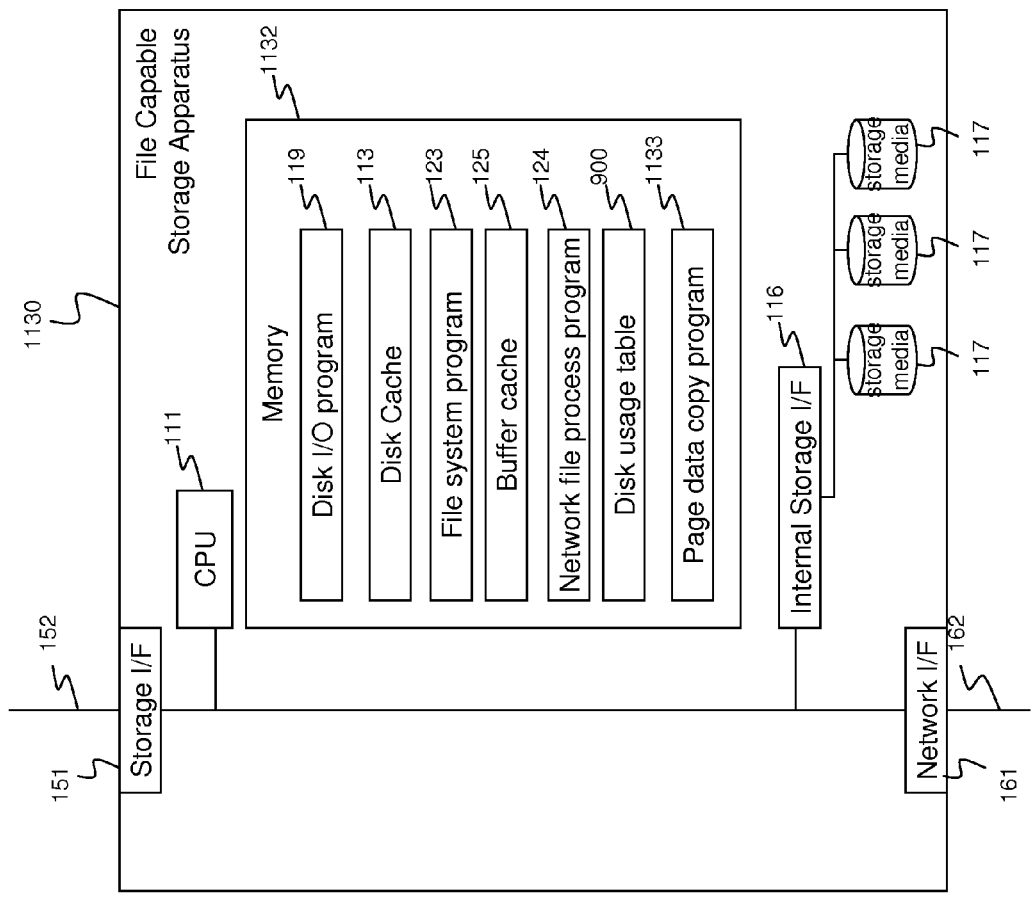

Fig. 12

PAGE MAPPING TABLE 1200

| Volume ID | Page Offset | Length | Node ID | In file | Disk ID | Disk Offset |
|---|---|---|---|---|---|---|
| vol1 | 0 | 70 | Internal | | 1 | 50 |
| vol1 | 70 | 30 | Node 1 | no | 3 | 150 |
| vol1 | 100 | 10 | Node 1 | yes | | |
| vol1 | 110 | 30 | Internal | | 2 | 100 |
| vol2 | 0 | 5 | Node 1 | yes | | |

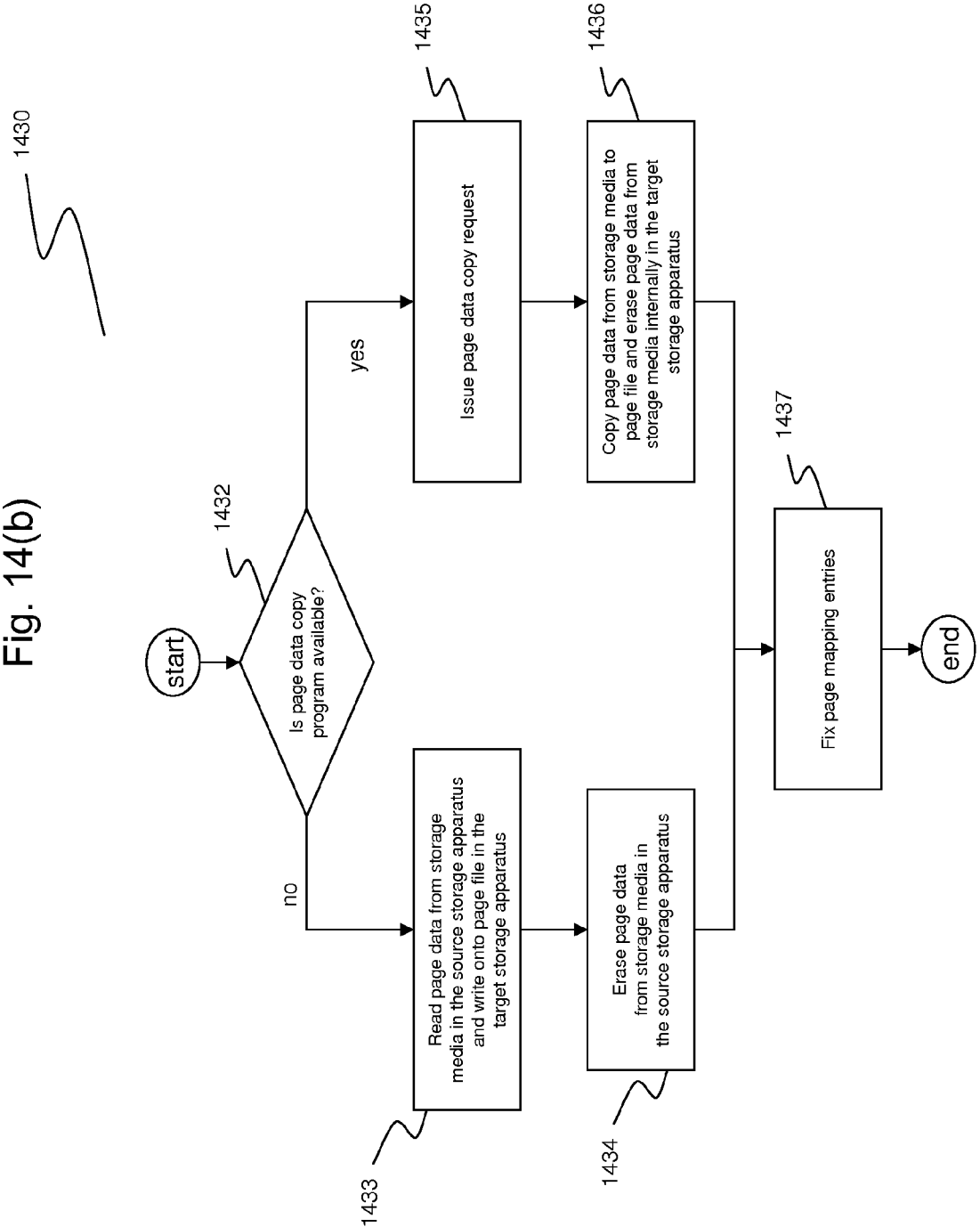

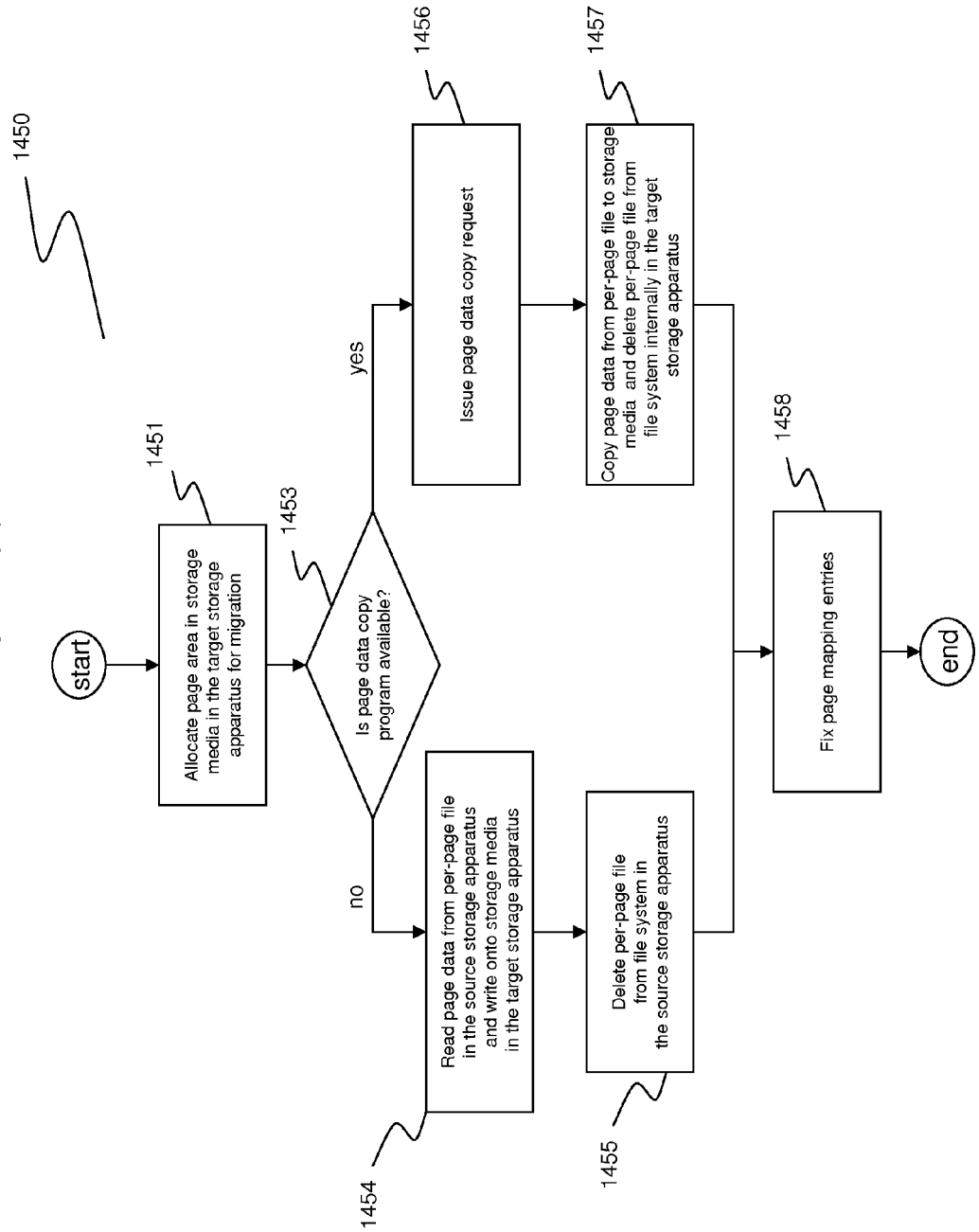

I/O CONVERSION METHOD AND APPARATUS FOR STORAGE SYSTEM

BACKGROUND OF THE INVENTION

The present invention relates generally to storage systems and, more particularly, to methods and apparatus for managing the data location at a storage system, especially a storage system that has the chunk allocation capability to allocate a chunk to a logical volume from a chunk pool as well as the capability to access files in internal or external file systems.

To reduce wasted physical blocks in raw storage media, "thin provisioning" based on dynamic chunk allocation capability is adapted to storage system configurations. This type of storage system has special logical volumes, which are logical volumes that have no physical blocks initially. The storage system constructs a chunk pool with raw block devices and allocates a chunk from the chunk pool when the logical volumes receive a write command and a chunk has not yet been allocated to appropriate physical blocks as specified in the write command. Using this technology, the user of the storage system does not need to prepare many raw block devices or large raw block devices initially and can add devices later as more volumes are actually consumed.

When using the thin provisioning technology, the chunk size is an important factor for the effectiveness of reducing wasted blocks. A whole chunk is allocated even when the host computer writes only a few bytes onto the un-allocated area. Thus, if the chunk size is large, a large volume of raw block devices is unnecessarily consumed. Furthermore, the deduplication method between chunks will not work effectively because it is less probable that larger chunks have the same contents. By making the chunk size smaller, the effectiveness of reducing the waste and the de-duplication will be better. However, smaller chunks require more memory for the chunk mapping table between data volumes and raw block devices.

U.S. Pat. No. 6,725,328 discloses the dynamic chunk allocation method and apparatus to realize thin provisioning storage. U.S. Patent Publication No. 2007/0055713 discloses the dynamic chunk allocation with block devices that have different characters to realize per-chunk tiered storage. U.S. Patent Publication No. 2009/0132619 discloses the deduplication method for a storage system. U.S. Pat. No. 7,330,950 discloses the per-file hierarchical storage management method. The entire contents of these references are incorporated herein by reference.

BRIEF SUMMARY OF THE INVENTION

Exemplary embodiments of the invention provide methods and apparatus for controlling the chunk allocation to each data volume in a storage system. This invention enables multi-size chunk allocation and multi-protocol access for data. In specific embodiments, the storage apparatus allocates some chunks on an external file server or an internal file system as per-page files. Furthermore, the storage apparatus can also split the per-page file to per-segment files, where a segment is an intermediate level of block size between a page (largest) and a sector (smallest). The file system manages file tree structure on disks; hence, there is no need for much memory to store the chunk allocation information even if the chunk is split to plural files. Furthermore, host computers can issue I/O via disk I/O such as FC/iSCSI.

One aspect of the present invention is directed to an information system that includes a host computer which issues an I/O request to a storage system. The storage system comprises a storage apparatus which includes a processor, a plurality of storage disks, and a memory storing a page mapping table, a page mapping program, and a page-filename mapping program; and a file system which manages a file tree of files with filenames. The page mapping table specifies a relationship between data volumes in the storage apparatus that are accessible from the host computer and the storage disks and the file system, the data volumes each including a plurality of pages, each page including a plurality of segments, each segment including a plurality of sectors. The file tree has for each storage apparatus a hierarchy of directories and files based on relationships among the data volumes, the pages, and the segments. The page mapping program and the page-filename mapping program are executable by the processor to specify, by page, a location of data contained in the I/O request by referring to the page mapping table and the file tree.

In one embodiment, the storage system comprises a plurality of storage apparatuses and a file server, wherein the file system is provided in the file server, and wherein the file server is connected to the storage apparatuses via a file access network for file I/O. In another embodiment, the storage system further comprises a file server in which the file system is provided; wherein the storage apparatus and the file server each include a converged interface to be coupled to a converged network for processing both storage protocol and file I/O protocol.

In another embodiment, the file system is provided in the storage apparatus which has file service capability. The page mapping table specifies at least one row of entries for each data volume with a volume identifier in the storage apparatus, each row of entries associated with a successive group of pages for the volume identifier, each row of entries including a page offset indicating an offset of data volumes, a length indicating a length of the group of pages in the row, and one of (a) a "yes" entry for "in file" indicating that the group of pages in the row is located in the file system, or (b) a disk identifier identifying a storage disk to place page data, and a disk offset indicating an offset of the storage disk for the group of pages of the row.

In another embodiment, the storage system further comprises a file capable storage apparatus in which the file system is provided, the file capable storage apparatus being coupled to the storage apparatus via an internal storage area network for disk I/O and via a file access network for file I/O. The page mapping table specifies at least one row of entries for each data volume with a volume identifier in the storage apparatus, each row of entries associated with a successive group of pages for the volume identifier, each row of entries including a page offset indicating an offset of data volumes, a length indicating a length of the group of pages in the row, and one of (a) a node identifier of "internal" indicating to place page data in a storage disk in the storage apparatus, a disk identifier identifying a storage disk in the storage apparatus to place the page data, and a disk offset indicating an offset of the storage disk for the group of pages of the row; or (b) a node identifier identifying the file capable storage apparatus to place page data, and one of (i) a "yes" entry for "in file" indicating that the group of pages in the row is located in the file system of the file capable storage apparatus or (ii) a "no" entry for "in file" indicating that the group of pages in the row is located in a storage disk in the file capable storage apparatus, a disk identifier identifying the storage disk in the file capable storage apparatus to place page data, and a disk offset indicating an offset of the storage disk for the group of pages of the row. The storage system may comprise a plurality of storage apparatuses each coupled to the file capable storage apparatus via the internal storage area network for disk I/O and via the file access network for file I/O. In another embodiment, the storage system further comprises a file capable storage apparatus in which the file system is provided, the file capable storage apparatus being coupled to the storage apparatus via a file access network for file I/O, wherein the storage apparatus and the file capable storage apparatus each have a storage interface for disk I/O with the host computer.

In some embodiments, the page mapping table specifies at least one row of entries for each data volume with a volume identifier in the storage apparatus, each row of entries associated with a successive group of pages for the volume identifier, each row of entries including a page offset indicating an offset of data volumes, a length indicating a length of the group of pages in the row, and one of (a) a node identifier identifying the file server to place page data, or (b) a disk identifier identifying a storage disk in the storage apparatus to place page data, and a disk offset indicating an offset of the storage disk for the group of pages of the row.

In specific embodiments, the file tree has for each storage apparatus a per-storage directory, a plurality of per-volume directories under each per-storage directory, at least one per-page file under one or more of the per-volume directories, at least one per-page directory under one or more of the per-volume directories, and a plurality of per-segment files under each of the at least one per-page directory.

Another aspect of the invention is directed to an information system that includes a host computer which issues an I/O request to a storage system, the storage system having a storage apparatus which includes a processor, a plurality of storage disks, and a memory storing a page mapping table; and a file system which manages a file tree of files with filenames, wherein the page mapping table specifies a relationship between data volumes in the storage apparatus that are accessible from the host computer and the storage disks and the file system, wherein the file tree has for each storage apparatus a per-storage directory, a plurality of per-volume directories under each per-storage directory, at least one per-page file under one or more of the per-volume directories, at least one per-page directory under one or more of the per-volume directories, and a plurality of per-segment files under each of the at least one per-page directory. A method of specifying a location of data contained in the I/O request by referring to the page mapping table and the file tree comprises, for each target page of the data contained in the I/O request: determining whether the target page is described in the page mapping table; if not, returning "page not allocated" information; if yes, then, determining whether the target page is mapped to the storage disks as described in the page mapping table; if yes, calculating a position in the storage disks and returning "allocated in disk" information with the calculated position; if no, then, determining whether the target page corresponds to a per-page file in the file system by referring to the file tree; if yes, returning "allocated in per-page file" information with a filename of the per-page file; if no, then determining whether the target page corresponds to a per-page directory in the file system by referring to the file tree; if no, returning "page not allocated" information; if yes, then determining whether the target page corresponds to a per-segment file in the file system by referring to the file tree; if yes, returning "allocated in per-segment file" information with a filename of the per-segment file; if no, then returning "segment not allocated" information.

In some embodiments, the storage system further includes a file capable storage apparatus in which the file system is provided, the file capable storage apparatus being coupled to the storage apparatus. The method further comprises, in determining whether the target page is mapped to the storage disks as described in the page mapping table, if yes, calculating a position in the storage disks of the storage apparatus and returning "allocated in disk" information with the calculated position only if the target page is mapped to an internal node of the storage apparatus, but if the target page is not mapped to an internal node of the storage apparatus, then calculating a position in the storage disks of the file capable storage apparatus and returning "allocated in external storage" information with the calculated position.

In one embodiment, one of the storage apparatus and the file capable storage apparatus is a source storage apparatus and another one of the storage apparatus and the file capable storage media is a target storage apparatus. The method further comprises allocating a page area in an unused area of a storage disk of the target storage apparatus; copying page data in the storage disk in the source storage apparatus onto the storage disk in the target storage apparatus to migrate a page; fixing the entries of the page mapping table to specify location of the migrated page; and erasing the page data in the storage disk of the source storage apparatus.

In another embodiment, one of the file capable storage apparatus or the storage apparatus is a source storage apparatus and the file capable storage apparatus is a target storage apparatus. The method further comprises: if the target storage apparatus does not have a page data copy program to copy data from the source storage apparatus to the target storage apparatus, then reading page data from a storage disk in the source storage apparatus and writing the page data to a page file of the target storage apparatus, and erasing the page data from the storage disk in the source storage apparatus; and if the target storage apparatus has a page data copy program to copy data from the source storage apparatus to the target storage apparatus, then issuing a page data copy request to the target storage apparatus and copying page data internally from a storage disk of the target storage apparatus to a page file in the file system of the target storage apparatus and erasing the page data from the storage disk of the target storage apparatus.

In another embodiment, the file capable storage apparatus is a source storage apparatus and one of the file capable storage apparatus or the storage apparatus is a target storage apparatus. The method further comprises allocating a page area in an unused area of a storage disk of the target storage apparatus; if the target storage apparatus does not have a page data copy program to copy data from the source storage apparatus to the target storage apparatus, then reading page data from a per-page file in the file system of the source storage apparatus and writing the page data to the storage disk of the target storage apparatus, and deleting the per-page file from the file system of the source storage apparatus; and if the target storage apparatus has a page data copy program to copy data from the source storage apparatus to the target storage apparatus, then issuing a page data copy request to the target storage apparatus and copying page data internally from a per-page file in the file system of the target storage apparatus to the storage disk of the target storage apparatus and deleting the per-page file from the file system of the target storage apparatus.

In specific embodiments, the storage system further includes a file server in which the file system is provided, the file server being coupled to the storage apparatus. The method further comprises copying target page data of the target page in a storage disk of the storage apparatus to a file in the file server in which the file system is provided; modifying the page mapping table to specify that the target page is located in the file server; and erasing the page data of the target page in the storage disk of the storage apparatus.

In specific embodiments, the storage system further includes a file server in which the file system is provided, the file server being coupled to the storage apparatus. The method further comprises allocating an unused page area from a storage disk of the storage apparatus by referring to the page mapping table; copying data in a per-page file in the file server to the allocated page area for migrating a page; modifying the page mapping table to specify that the migrated page is located in the storage disk of the storage apparatus; and deleting the per-page file in the file server.

In some embodiments, the method further comprises making a new per-page directory; creating per-segment files in the new per-page directory; copying data in a per-page file to the created per-segment files; and deleting the per-page file. The method further comprises concatenating per-segment files to a per-page file; and if any per-segment file does not exist, filling a corresponding area in the per-page file with zeroes.

These and other features and advantages of the present invention will become apparent to those of ordinary skill in the art in view of the following detailed description of the specific embodiments.

BRIEF DESCRIPTION OF THE DRAWINGS

FIG. 2 shows an example of a page mapping table.

FIG. 6 shows a specific page mapping table in a migration example.

FIGS. 8a and 8b illustrate an example of a second embodiment configuration of an information system in which the method and apparatus of the invention may be applied.

FIG. 10 shows an example of page mapping table.

FIGS. 11a-11g illustrate an example of a third embodiment configuration of an information system in which the method and apparatus of the invention may be applied.

FIG. 12 shows an example of the page mapping table.

FIG. 14b shows an example of the migration flow to migrate page data from storage media in the source storage apparatus to per-page file on the file system in the source file capable storage apparatus.

FIG. 14c shows an example of the migration flow to migrate page data from per-page file on the file system in the source file capable storage apparatus to the storage media in the target storage apparatus.

DETAILED DESCRIPTION OF THE INVENTION

Figure 1A:
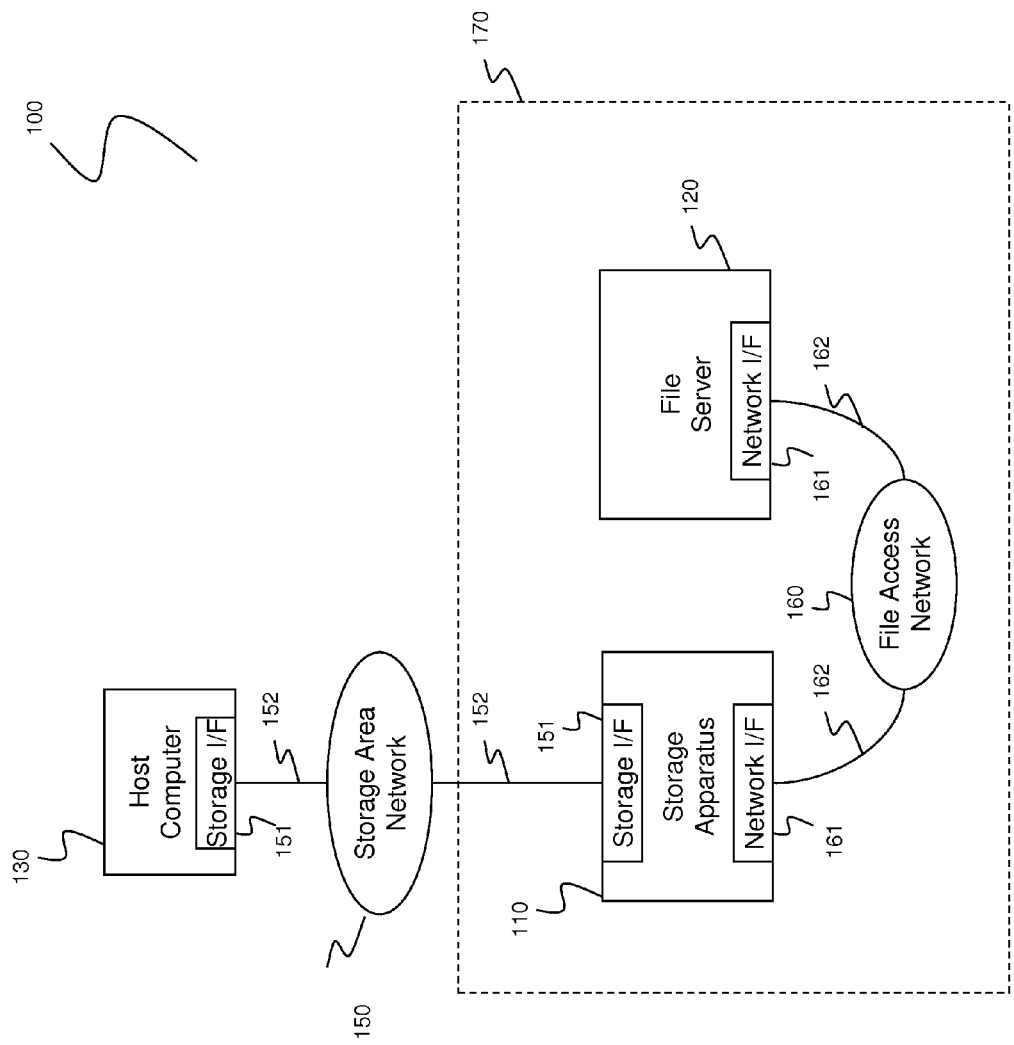
FIGS. 1a-1c illustrate an example of a first embodiment configuration of an information system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for managing the data location at a storage system, especially a storage system that has the chunk allocation capability to allocate a chunk to a logical volume from a chunk pool as well as the capability to access files in internal or external file systems. This invention can be used in storage systems for controlling chunk allocation for each logical volume on both internal storage media and internal/external file systems, especially in storage systems that have the dynamic chunk allocation capability among raw block devices and file servers.

I. First Embodiment

A. System Configuration

Figure 1B:
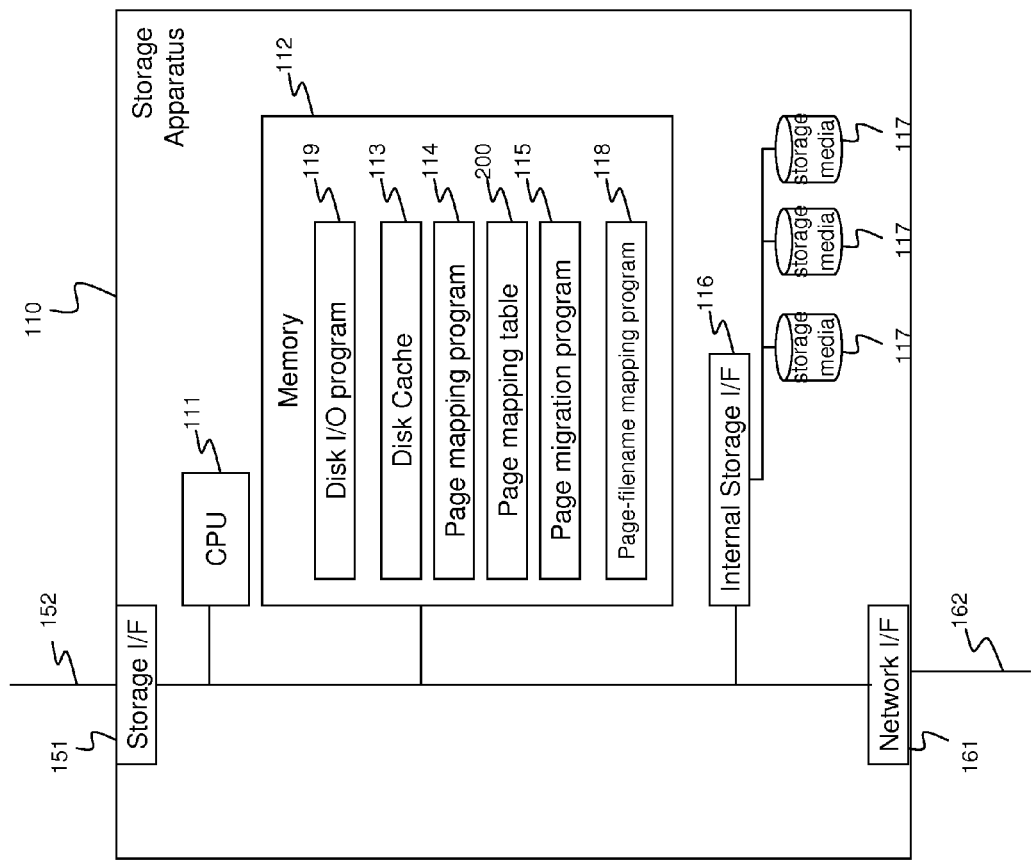
Figure 1C:
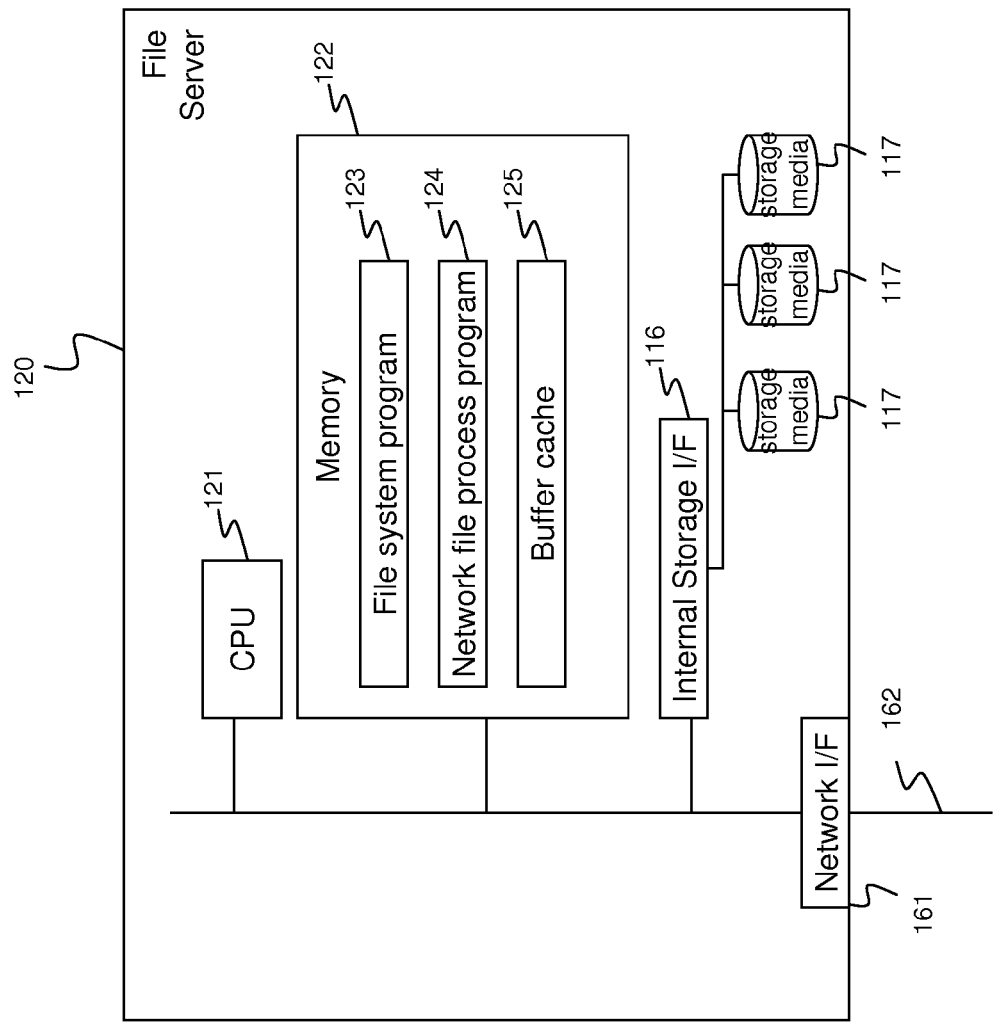

FIGS. 1a-1c show an example of the information system 100 in which the method and apparatus of this invention may be applied. The information system includes a host computer 130, a network 150, and a storage system 170. The storage system 170 has at least one storage apparatus 110 and at least one file server 120. The storage apparatus 110 and the file server 120 communicate via a file access network 160. The host computer 130 issues I/O requests to the storage apparatus 110 using a storage interface 151 via the SAN (Storage Area Network) 150.

As seen in FIG. 1b, the storage apparatus 110 includes a CPU (Central Processing Unit) 111, a memory 112, an internal storage interface 116, at least one storage media 117, a storage interface 151, and a network interface 161. The CPU 111 controls the devices in the storage apparatus 110 by executing the programs in the memory 112. The memory 112 stores various programs, tables, and cache. The CPU 111 processes I/O requests from the host computer 130 via the storage interface 151 by executing the disk I/O program 119. In the disk I/O process, the CPU 111 executing the disk I/O program 119 determines the location of the requested data by referring to the page mapping table 200. The CPU 111 uses an area of the memory 112 as a disk cache 113 and stores data on the disk cache 113 to hide the latency to the access storage media 117 and respond to I/O requests quickly. The CPU 111 issues I/O requests to the storage media 117 or external file server 120 by referring to the page mapping program 114 and the page-filename mapping program 118. The CPU 111 also migrates data between the storage media 117 and the external file server 120, or between files in the external file server 120 by referring to the page migration program 115. The storage apparatus 110 has more than one storage media 117. The CPU 111 can read/write data from/onto the storage media 117 through the internal storage interface 116. The FC (Fibre Channel), SATA (Serial Attached Technology Attachment), SAS (Serial attached SCSI), IDE (Integrated Device Electronics) or other interfaces are used to access the storage media 117. The storage apparatus 110 can use various kinds of storage media such as HDD (Hard Disk Drive), SSD (Solid State Drive), flush memories, optical disks, magnetic tapes and so on. Their array by RAID (Redundant Array of Independent Disk) technology is also available for the storage media 117. Furthermore, the storage apparatus 110 can use the other storage apparatus as storage media 117.

As shown in FIG. 1c, the file server 120 includes a CPU 121, a memory 122, an internal storage interface 116, at least one storage media 117, and a network interface 161. The CPU 121 controls the devices in the file server 120 by executing the programs in the memory 122. The memory 122 has programs and cache, including a file system program 123 and a network file process program 124. The CPU 121 processes file I/O requests and reads/writes data from/onto the storage media 117 by referring to the file system program 123. The CPU 121 receives file I/O requests from the external computers via the network interface 161 and redirects the I/O requests to the file system program 123 by referring to the network file process program 124. The CPU 121 uses an area of the memory 112 as the buffer cache 125. The buffer cache 125 stores data to reduce I/O to the storage media and accelerate file I/O.

For communication in the information system, the host computer 130 and the storage apparatus 110 have storage interfaces 151. Using the storage interfaces 151, the host computer 130 and storage apparatus 110 communicate for I/O via the SAN 150. There are common storage protocols for storage interface 151 and SAN 150 such as FC (Fibre Channel), iSCSI (Internet Small Computer System Interface), FCoE (FC over Ethernet), and so on. In addition, each computer having a network interface 161 can communicate and issue file I/O to the file server 120 via the file access network 160. There are common protocols for file I/O interface via network such as NFS (Network File System), CIFS (Common Internet File System), and AFP (Apple Filing Protocol). Furthermore, each computer can communicate with other computers for various purposes. The host computer 130 is the user of the storage system 170. The host computer 130 issues I/O using the storage interface 151 via the SAN 150.

B. Network Topology Variation and Converged Network

Figure 1D:
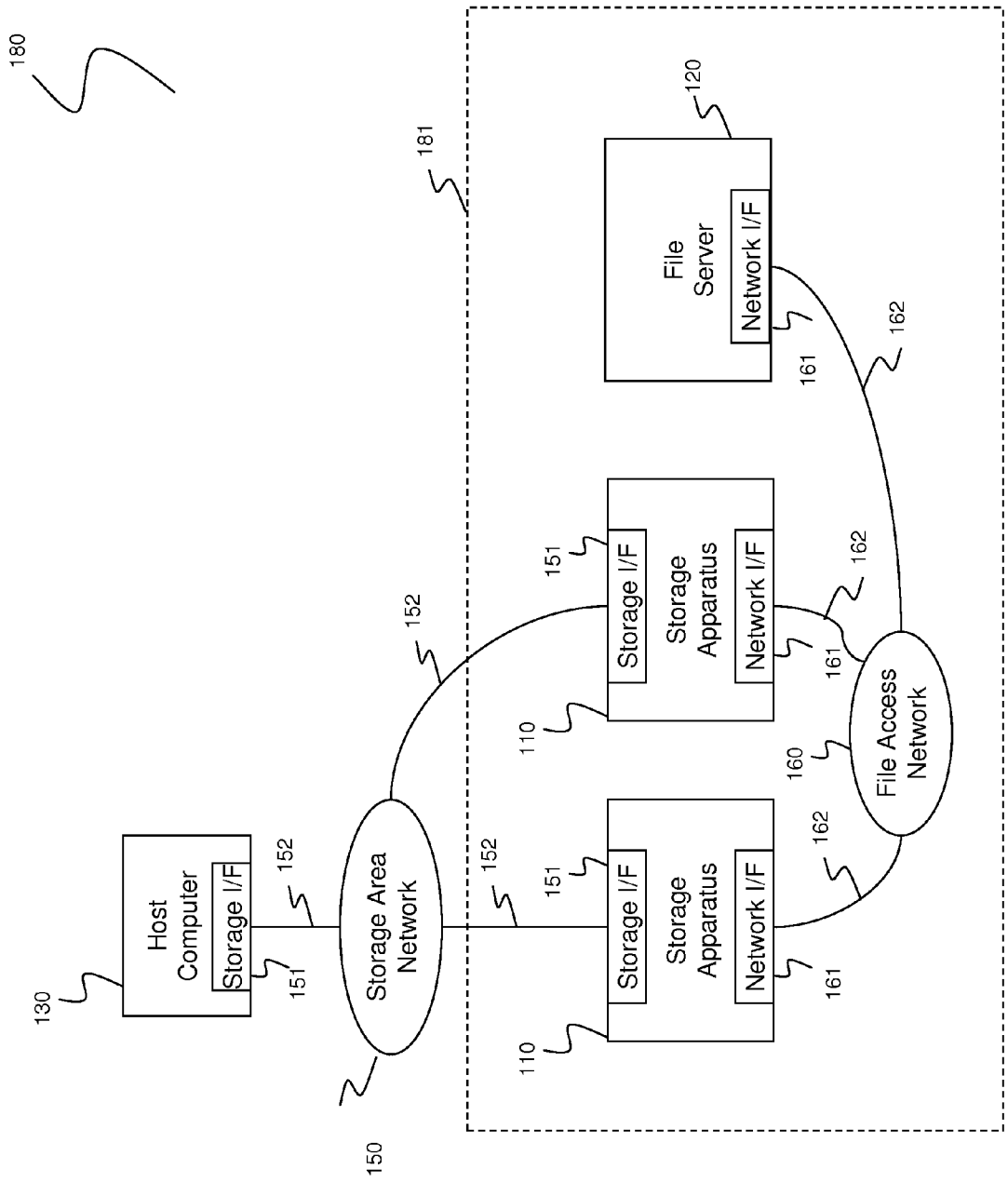
FIGS. 1d and 1e illustrate another example of a first embodiment configuration of an information system in which the method and apparatus of the invention may be applied.
Figure 1E:
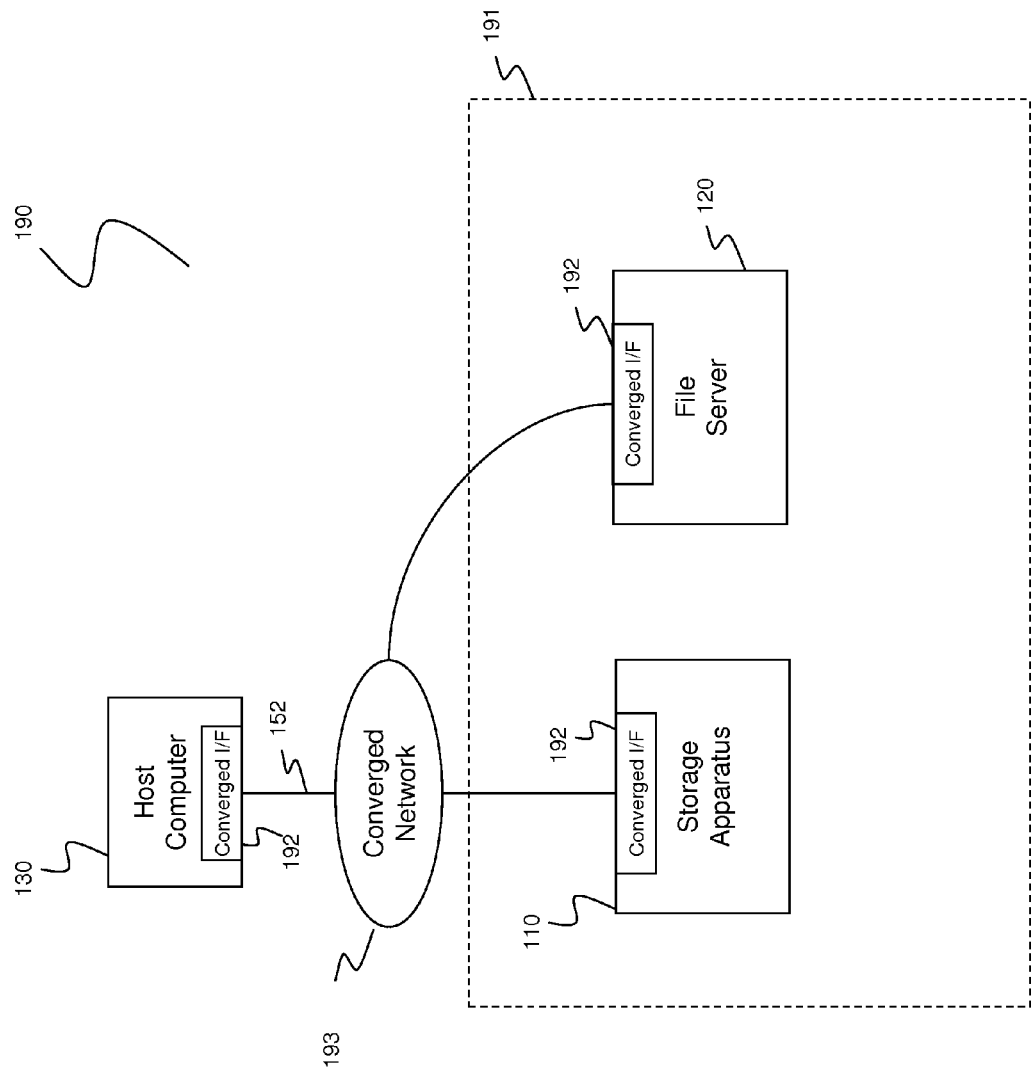

FIGS. 1d and 1e show other examples of the information system 180 and 190 in which the method and apparatus of this invention may be applied. In the system configuration 180 of FIG. 1d, there are plural storage apparatus (e.g., two) 110 and both apparatus 110 can issue file I/O requests to the file server 120 via the file access network 160. In the system configuration 190 of FIG. 1e, each computer has the converged interface 192 that communicate via the converged network 193. The converged interface 192 and the converged network 193 can process both storage protocol and file I/O protocol in the same physical media. For example, FCoE, iSCSI, NFS, and CIFS are supported. In this situation, the storage apparatus 110, the file server 160, and the host computer 130 each have the converged interface 192 instead of the storage interface 151 and the network interface 161. Because the converged interfaces 192 and the converged network 193 support both storage protocol and file I/O protocol, the following discussion for information system configuration 110 of FIG. 1b is also applicable for the information system configuration 190 of FIG. 1e.

C. Block Size Levels

FIGS. 15a-15d illustrates the different levels of block size. "Sector" 1510 is the minimum size and common unit between the host computer 130 and storage apparatus 110. For example, the sector size in SCSI (Small Computer System Interface) is 512 bytes. For the host computer 130, "Volume" 1500 looks like an array of sectors. The host computer 130 issues I/O by specifying a target volume 1500, the start sector of the volume 1500, and the number of sectors 1510 to read from or write onto.

For storage apparatus 130, "Volume" 1500 includes a plurality of "Pages" 1520. Each page 1520 in one volume 1500 has the same size. The page mapping program 114 and the page mapping table 200 manage dynamic chunk allocation by page 1520. When the size of the page is large, the page mapping table 200 has only to manage fewer entries and needs less memory consumption. However, larger pages induce internal fragmentations, less effectiveness of thin provisioning, and less effectiveness of de-duplication for pages. "Segment" 1530 is the intermediate level between page 1520 and sector 1510. One page 1520 consists of a single segment or a plurality of segments 1530, and one segment consists of a single sector or a plurality of sectors 1510. Each segment 1530 in one volume 1500 has the same size. As with the page size discussion above, the segment size has a similar trade-off between memory consumption and effectiveness of thin provisioning and de-duplication. Each storage apparatus 110 can use the same page size and segment size for every volume or different page size and segment size on a volume-by-volume or storage media-by-media basis.

Page 1520 and segment 1530 are factors managed inside storage system 170 and so host computers 130 do not need to know the concept of page 1520 and segment 1530.

D. Page Mapping Table

FIG. 2 shows an example of a page mapping table 200. The page mapping table 200 describes the relationship between logical volumes that are accessible from the host computer 130, the storage media 117, and the file server 120. Each row of the page mapping table 200 shows the information for one group of successive pages for a Volume ID 210 storing the ID of logical volumes. A Page Offset 220 stores the offset of logical volumes. A Length 230 shows the length of the pages in each entry. Each row has either a Node ID 240 or a Disk ID 250. The Node ID 240 is the unique ID to specify a file server 120 to place the page data. The Node ID 240 can accept the name of the file server, IP address, or index of file server list. The Disk ID 250 is the unique ID to specify a storage media 117 to place the page data. If the disk ID 250 is specified, that row must have a Disk Offset 260. The Disk Offset 260 shows the offset of storage media 117 for the group of pages in this row.

E. Page/Segment Mapping File Tree

Figure 3:
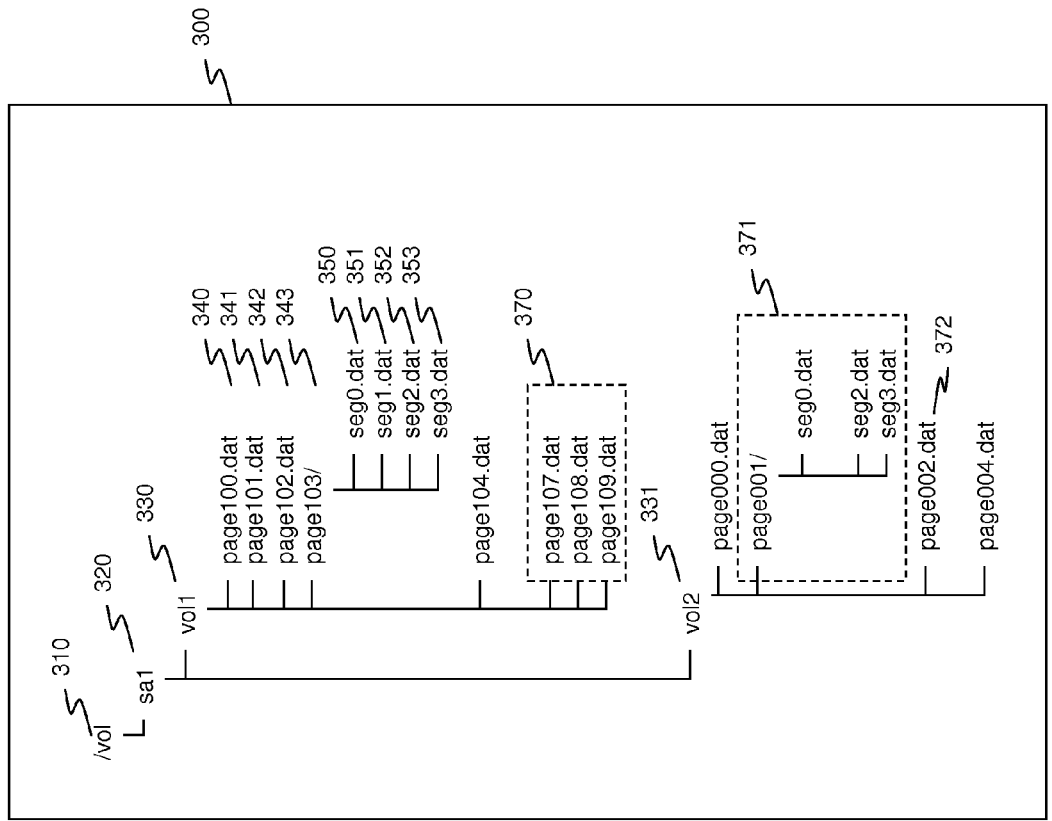
FIG. 3 shows an example of the file tree which the file server manages.

FIG. 3 shows an example of the file tree 300 which the file server 120 manages. The files server 120 has files corresponding to data allocated on the file server 120 in the page mapping table 200. The file tree 300 has, for a top directory 310, per-storage directories 320 corresponding to the storage apparatus. Even if multiple storage apparatus 110 share the file server 120, the file server 120 permits each storage apparatus to access only its own per-storage directory 320 and prevents data corruption between the storage apparatus. There are per-volume directories 330 and 331 located under the per-storage directory 320. The names of the per-volume directories 330 and 331 are derived from the volume IDs in the storage apparatus 110. There are per-page files or directories 340-343 under the per-volume directory 330, 331. The names of the per-page files and directories 340-343 are derived from the page numbers. Furthermore, the file server 120 can have either a per-page file or a per-page directory per page. The names of the per-page files and directories are derived from the page numbers. For example, the per-page file 340 "page100.dat" corresponds to the 101st page of the volume "vol1" of the storage apparatus "sa1." (Page number starts at 0 and "100" means 101st page.) The per-page directory 343 "page103" corresponds to the 104th page of the volume "vol1" of the storage apparatus "sa1." The per-page directory 343 can have per-segment files 350-353. The names of such per-segment files are derived from the segment numbers. For example, the per-segment file 351 "seg1.dat" corresponds to the second segment of the 104th page of the volume "vol1" of the storage apparatus 112. Following the rules mentioned above, the page-filename mapping program 118 generates the path name of the per-page files and per-segment files. For example, the page-filename mapping program 118 generates the path name "/vol/<storage apparatus name>/<volume id>/page.dat" or "/vol/<storage apparatus name>/<volume id>/page/segment<segment number>dat."

F. I/O Mapping Method

Figure 4:
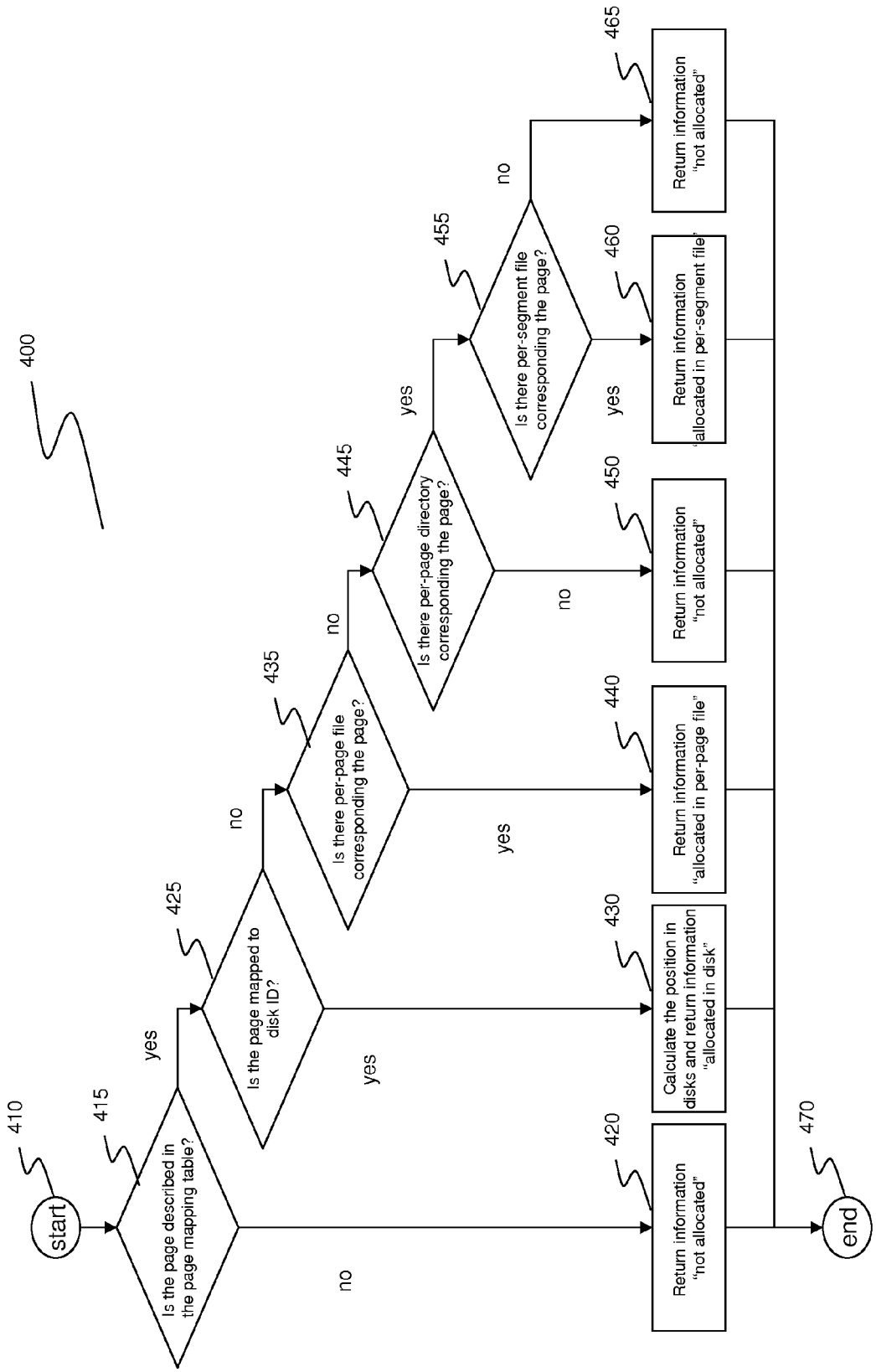
FIG. 4 shows an example of the I/O mapping process in the first embodiment.

When the disk I/O program 119 receives I/O requests from the host computer 130, the page mapping program 114 and the page-filename mapping program 118 specify where to read/write by referring to the page mapping table 200 and the file tree 300. FIG. 4 shows an example of the I/O mapping process 400. The following illustrates the detail of the I/O mapping process 400. The page mapping program 114 executes the I/O mapping process 400 per page, staring at step 410.

At step 415, the page mapping program 114 searches the chunk corresponding to the target page. The page mapping program 114 checks each entry of the page mapping table 200. If one of the entries whose volume ID matches that of the I/O target page and the target page is between page offset 220 and (page offset 220+length 230), the search succeeded. When the search failed, the page mapping program 114 responds with "the page is not allocated" at step 420 and ends the I/O mapping process 400 at step 470. For example, the page number 200 of volume "vol1" is not allocated.

When the search succeeded, the page mapping program 114 checks if the chunk is allocated on the disks at step 425. When the chunk is allocated on disk (that is, the entry in the page mapping table 200 has a valid disk ID), the page mapping program 114 calculates the position of the page and responds with "the page is on disk <DiskID>" at step 430. The page mapping program 114 can calculate the position by the following formula: (requested page number in volume)−(page offset written in the page mapping table entry)+(disk offset written in the page mapping table entry). For example, the page number 30 of volume "vol1" is located on page number 80 of disk 1.

When the entry shows the page is located on the file server 120 (that is, the entry has a valid node ID 240), the page mapping program 114 issues file I/O to search the per-page file at step 435 using the path name generated by the page-filename mapping program 118. If there is the corresponding per-page file, the page mapping program 114 returns the filename at step 440 with "allocated in per-page file." For example, when the page mapping program 114 receives the request for the 102nd page of the volume "vol1," the page mapping program 114 issues file I/O to detect the existence of "/vol/sa1/vol1/page101.dat." There is the file 341 in the file tree 300 and the page mapping program 114 returns the filename.

When there is not the per-page file, the page mapping program 114 issues a file I/O to search the per-page directory at step 445 using the path name generated by the page-filename mapping program 118. If the search failed, the page mapping program 114 responds with "the page is not allocated" at step 450 and ends the process 400. For example, the file tree 300 does not have either a per-page file "/vol/sa1/vol1/page105.dat" or a per-page directory "/vol/sa1/vol1/page105/." The page mapping program 114 generates a response that the page is not allocated for the 106th page of the volume "vol1."

When there is the per-page directory, the page mapping program 114 issues file I/O to search the per-segment file at step 455 using the path name generated by the page-filename mapping program 118. When the I/O size for this page is larger than a segment, steps 455, 460 and 465 are repeated per segment. If there is the corresponding per-page file, the page mapping program 114 returns the filename at step 460 with "allocated in per-segment file." If there is not, the page mapping program 114 responds with "the segment is not allocated" at step 465. For example, there is "/vol/sa1/vol1/page103/seg0.dat" but not "/vol/sa1/vol1/page103/seg5.dat" in the file tree 300. The page mapping program 114 generates a response that the segment is located on "/vol/sa1/vol1/page103/seg0.dat" for 1st segment of 104th page of the volume "vol1" and the segment is not allocated for 6th segment of 104th page of the volume "vol1."

In sum, by using the results of the I/O mapping process 400, the disk I/O program 119 actually issues read/write I/O to the storage media 117 or the external file server 120. If the page or segment is not allocated, the disk I/O program 119 can return I/O error or the page mapping program 114 allocates a new page there. That depends on the system configuration.

G. Page Migration and Mapping Conversion Method

When the system administrator specifies or some events occur, the page migration program 115 executes the page migration. For example, when there is not much available volume in the storage media 117, some pages are not accessed so often, or more I/O throughput for some pages is needed, migration is executed. During migration, I/O requests from the host computers 130 are being suspended. The page migration program 115 executes some patterns of migrations.

Figure 5B:
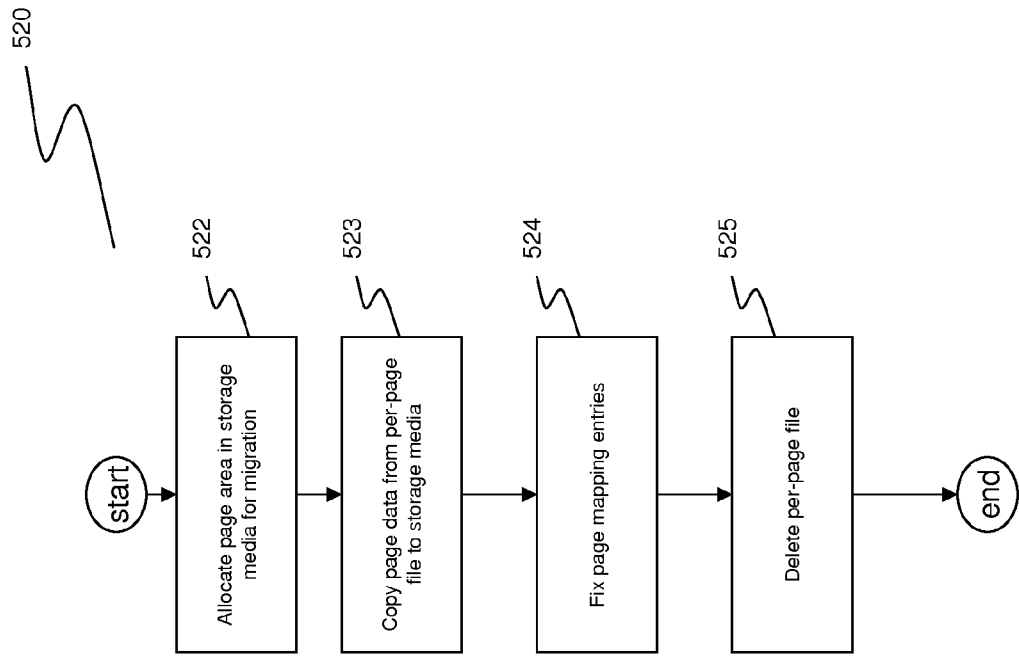
FIG. 5b shows an example of migration from per-page file to storage media.
Figure 5A:
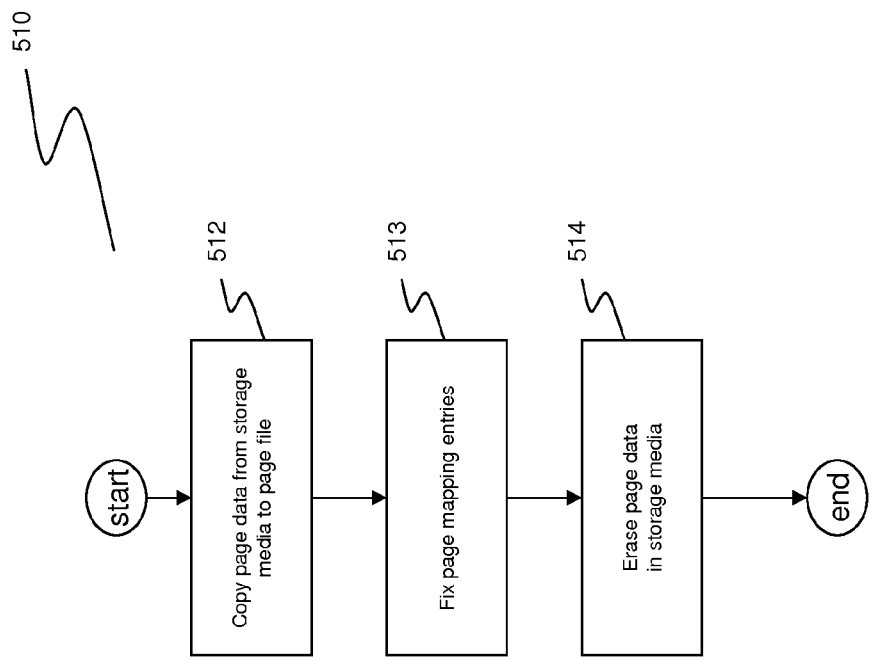
FIG. 5a shows an example of migration from storage media to per-page file.

As an example of migration from storage media to per-page file, FIG. 5a shows the migration flow 510 to migrate page on the storage media 117 to page file in the external file server 120. At step 512, the page migration program 115 copies the target page data in the storage media 117 to the file in the external file server 120. The file is based on the storage apparatus, the volume ID, and the page number as mentioned above. However, if all data of the page is filled with zero, file copy is not needed. After file copy, the page migration program 115 modifies the page mapping table 200 to specify that the migrated page is located in the external file server 120 at step 513. At step 514, the page migration program 115 erases the page data in the storage media. After this migration process flow, the migrated file is used as the per-page file.

As an example of migration from per-page file to storage media, FIG. 5b shows the migration flow 520 to migrate page in a per-page file in the external file server 120 onto the storage media 117. At step 522, the page migration program 115 allocates the unused page area from the storage media 117 by referring to the page mapping table 200. At step 523, the page migration program 115 copies data in the per-page file in the external file server 120 to the allocated page area.

After that, the page migration program 115 modifies the page mapping table 200 to specify that the migrated page is located in the storage media 117 at step 524. At step 525, the page migration program 115 deletes the per-page file in the external file server 120.

Figure 5D:
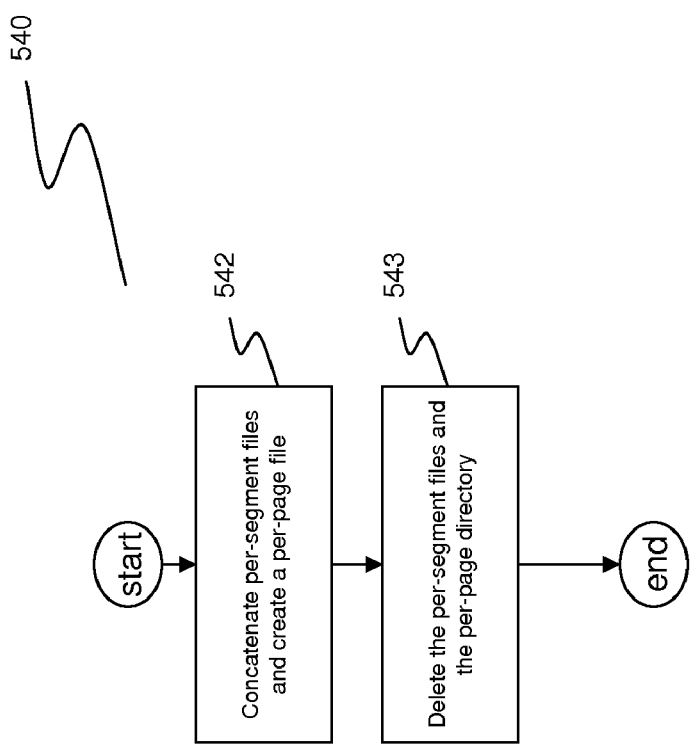
FIG. 5d shows an example of migration from per-segment file to per-page file.
Figure 5C:
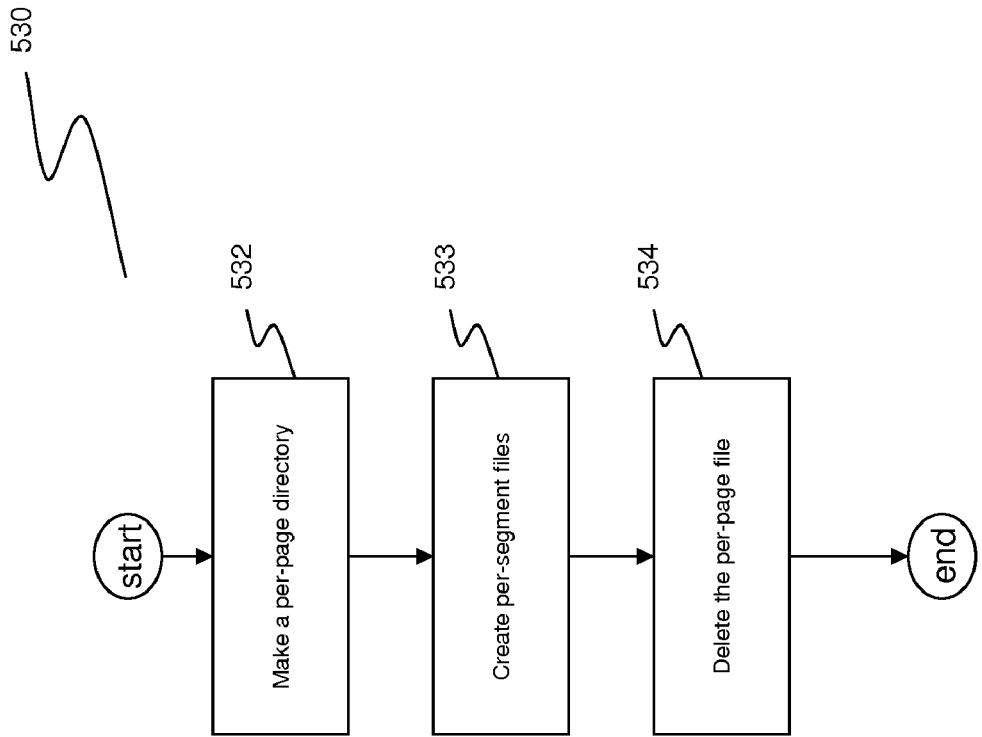
FIG. 5c shows an example of migration from per-page file to per-segment file.

As an example of migration from per-page file to per-segment file, FIG. 5c shows the migration flow 530 to migrate a page in a per-page file in the external file server 120 to per-segment files. At step 532, the page migration program 115 makes a new directory. At step 533, the page migration program 115 creates per-segment files and copies data in the per-page file to the per-segment files. In this step, if data in any segment are all zeros, the page migration program 115 does not have to create the corresponding per-segment files. After that, the page migration program 115 deletes the per-page file at step 534.

As an example of migration from per-segment file to per-page file, FIG. 5d shows the migration flow 540 to migrate a page in per-segment files in the external file server 120 to a per-page file. At step 542, the page migration program 115 concatenates the per-segment files to the per-page file. If any per-segment file does not exist, the corresponding area in the per-page file is filled with zeros. At step 543, the page migration program 115 deletes the per-segment files and the per-page directory storing the per-segment files.

After each migration, suspended I/O requests are resumed.

H. Migration Example

Figure 7:
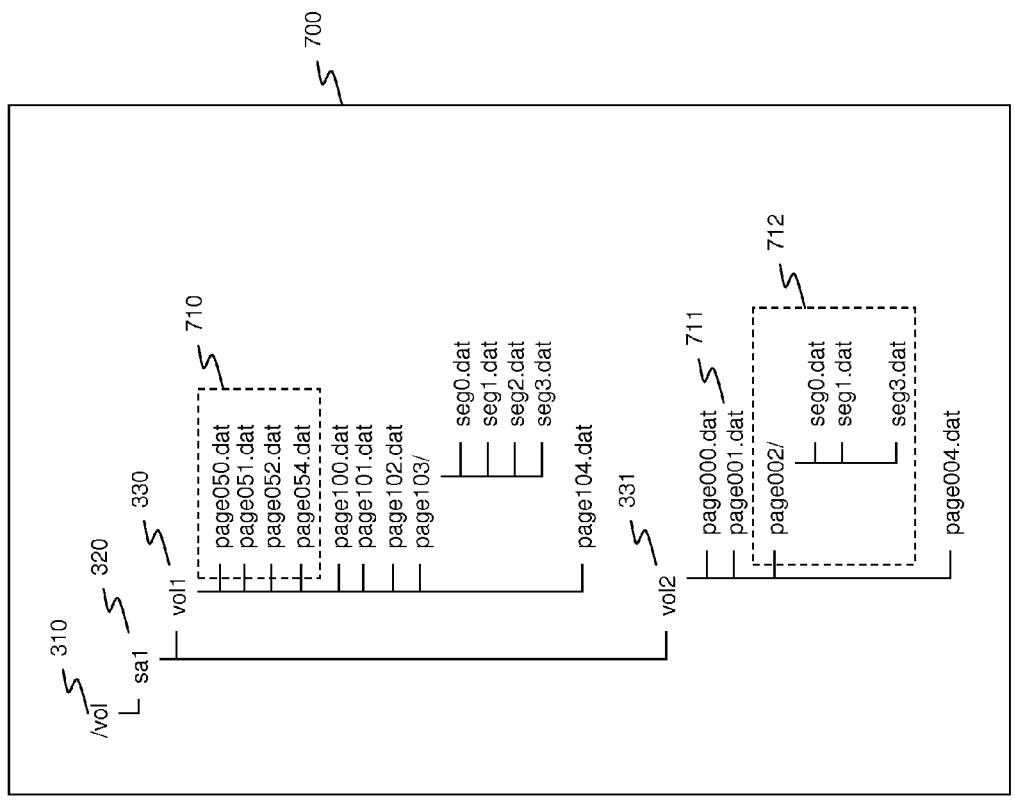
FIG. 7 shows a specific file tree table in a migration example.

As an example of migration, FIG. 6 shows a specific page mapping table 600 and FIG. 7 shows a specific file tree 700. The page mapping table 600 and the file tree 700 show the result of migration applied to the page mapping table 200 and the file tree 300.

Assuming that the page migration program 115 migrates pages 50 to 54 of volume "vol 1" from disk 1 to the external file server 112, the page mapping entry 270 (of FIG. 2) is split to three entries 670, 671, and 672 to specify that pages 50 to 54 were located in the external file server "node 1." Then, the file tree 700 has some per-page files 710. In this example, page 53 is filled with zeros and the per-page file "page53.dat" is not created.

Assuming that the page migration program 115 migrates pages 105 to 109 of volume "vol 1" from the external file server "node1" to disk 1, the page mapping entry 271 (of FIG. 2) is split to two entries 673 and 674 to specify that pages 105 to 109 are now located in disk 1. Then, the file tree 700 does not have the per-page files 370.

Assuming that the page migration program 115 migrates a page 2 of volume "vol 2" from the per-page file "page002.dat" 372 to per-segment files, the per-page file "page002.dat" 372 is removed and a per-page directory and per-segment files 712 are created after the migration. In this example, segment 2 is filled with zeros and the per-segment file "seg2.dat" is not created.

Assuming that the page migration program 115 migrates a page 1 of volume "vol 2" from the per-segment files 371" to a per-page file. After the migration, the per-page file "page001.dat" 711 is created and a per-page directory and per-segment files 371 are removed.

Using these I/O mapping and migration methods mentioned above, the storage system 170 enables to locate and migrate chunk data on the storage media 117 and the external file server 112, and the host 130 can access data on the file server 120 indirectly without file access protocols. Furthermore, this method enables split page data to some segments and the de-duplication method will run effectively. In the information system configuration 180 of FIG. 1d, the de-duplication over files of different storage apparatus 110 stored can be applied. For de-duplication, the methods such as that disclosed in US2009/0132619 are acceptable. The per-file hierarchical storage management methods such as that disclosed in U.S. Pat. No. 7,330,950 are also applicable and the per-file hierarchical storage management methods enable to store per-page files and per-segment files in cheaper storage media.

II. Second Embodiment

A. System Configuration

FIGS. 8a and 8b illustrate an example of a second embodiment configuration of an information system in which the method and apparatus of the invention may be applied. As seen in FIG. 8a, the information system for the second embodiment includes a host computer 130, a storage area network 150, and a storage system 810. The storage system 810 includes at least one storage apparatus 820. The host computer 130 issues I/O requests to the storage apparatus using a storage interface 151 via the SAN 150. As seen in FIG. 8b, the storage apparatus 820 is almost the same as the storage apparatus 110 of the first embodiments shown in FIG. 1 but has additional components. The storage apparatus 820 does not have to have the network interfaces. The memory 822 in the storage apparatus 820 has additional components as compared to the memory 112 of the first embodiment. The memory 812 has a file system program 123, a buffer cache 125, and a disk usage table 900. For communication, the host computer 130 and the storage apparatus 820 have storage interfaces 151. Using the storage interfaces 151, the host computer 130 and the storage apparatus 820 communicate for I/O via the SAN 150. There are common protocols for the storage interface 151 and the SAN 150 such as FC, iSCSI, FCoE, and so on. The host computer 130 is the user of the storage system 810. The host computer 130 issues I/O using the storage interface 151 via the SAN 150.

B. Volume Usage Table and File Service

Figure 9:
FIG. 9 shows an example of the disk usage table.

The storage apparatus 820 has both the disk I/O program 119 and the file system program 123, and hence the storage apparatus 820 can use disks composed of the internal storage media 117 for two purposes: disk I/O from host computers 130 and to create file system on it. FIG. 9 shows an example of the disk usage table 900 having columns of Disk ID 910, For host 920, and For file service 930. This disk usage table 900 describes which disks are used for disk I/O and which disks are for file services. The mapping table 200 in the storage apparatus 820 can only have entries that include disk IDs that are specified "for host" in the disk usage table 900. In the same way, the file system program 123 can only use disks whose ID are specified "for file service" in the disk usage table 900. Each disk is allocated either "for host" or "for file service."

C. Page Mapping Table

FIG. 10 shows an example of page mapping table 1000. The page mapping table 1000 is the same as the page mapping table 200 except the In file column 1010. The storage system 810 does not have external file servers but the storage apparatus 820 itself has file service capability. Then, the page data of each volume can be mapped to internal file systems. Thus, the column 1010 shows if the pages are allocated in internal file systems or not.

D. Page/Segment Mapping File Tree

The storage apparatus 820 can use the file tree 300 of FIG. 3. The directory 320 corresponding to the storage apparatus 820 can be omitted. The storage apparatus 820 can execute I/O mapping flow 400 as FIG. 4 shows and page migration flows 510, 520, 530, and 540 as FIG. 5 shows. Using these methods, the storage system 810 enables to locate and migrate chunk data on storage media 117 in the forms of files. Furthermore, this method enables split page data to some segments and the de-duplication method will run effectively. For de-duplication, the methods such as that disclosed in US2009/0132619 are acceptable. The per-file hierarchical storage management methods such that disclosed in U.S. Pat. No. 7,330,950 are also applicable, and the per-file hierarchical storage management methods enable to store some per-page files and per-segment files in cheaper storage media.

III. Third Embodiment

A. System Configuration

Figure 11A:
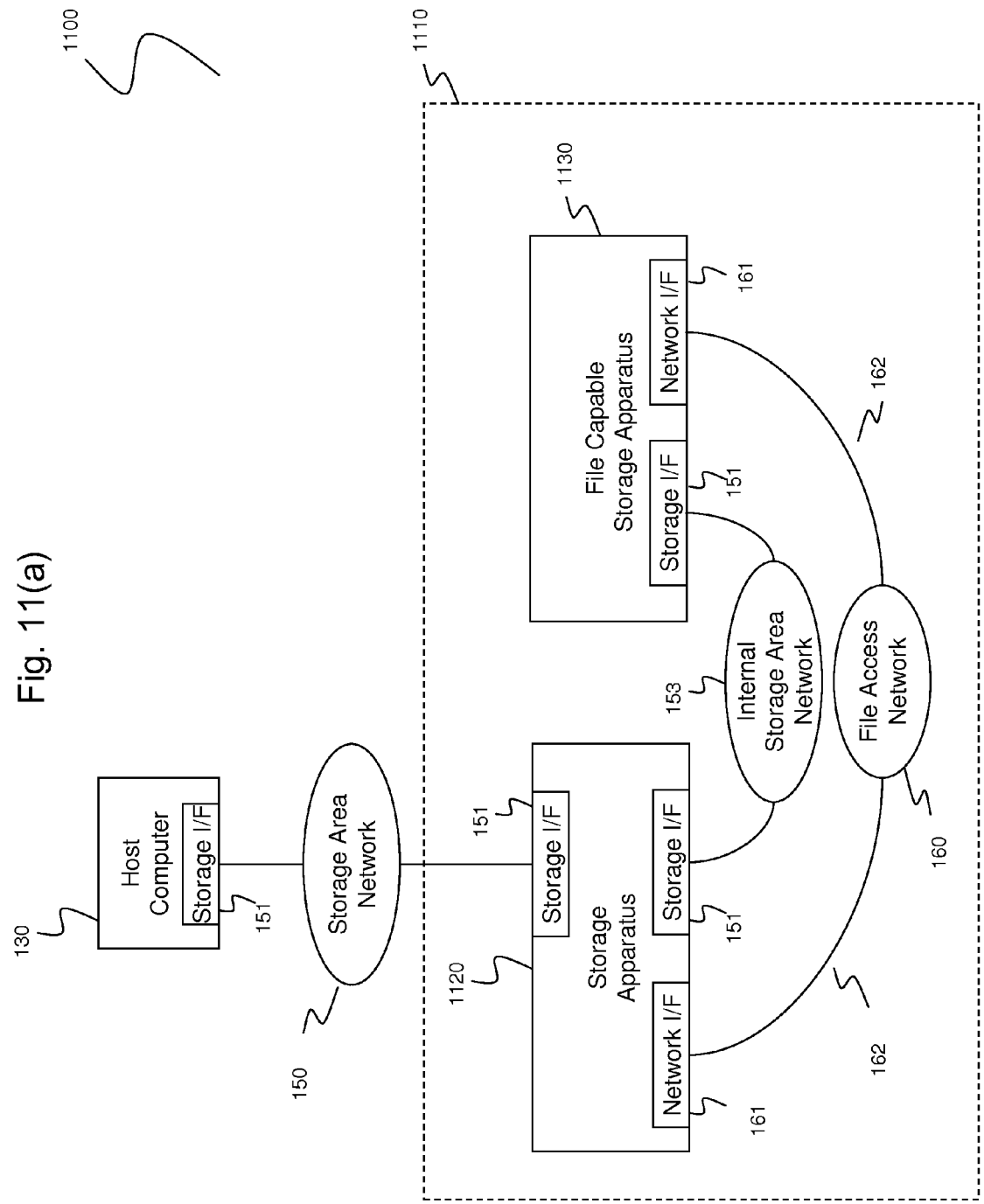
Figure 11B:
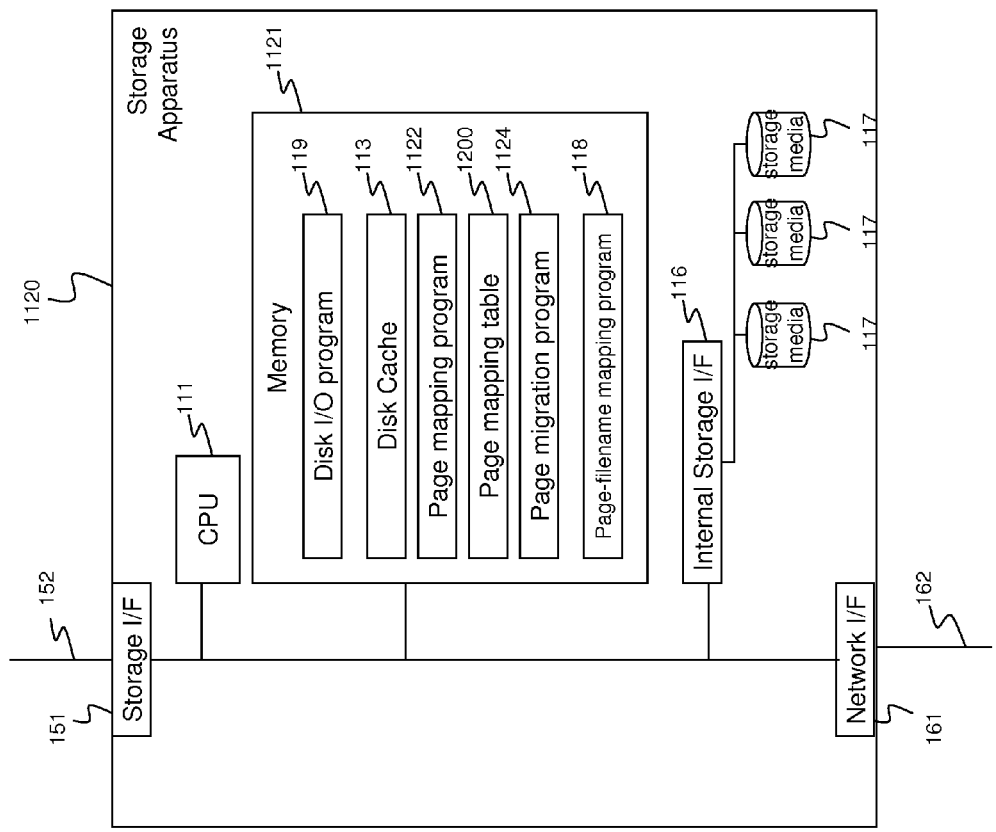
Figure 11D:
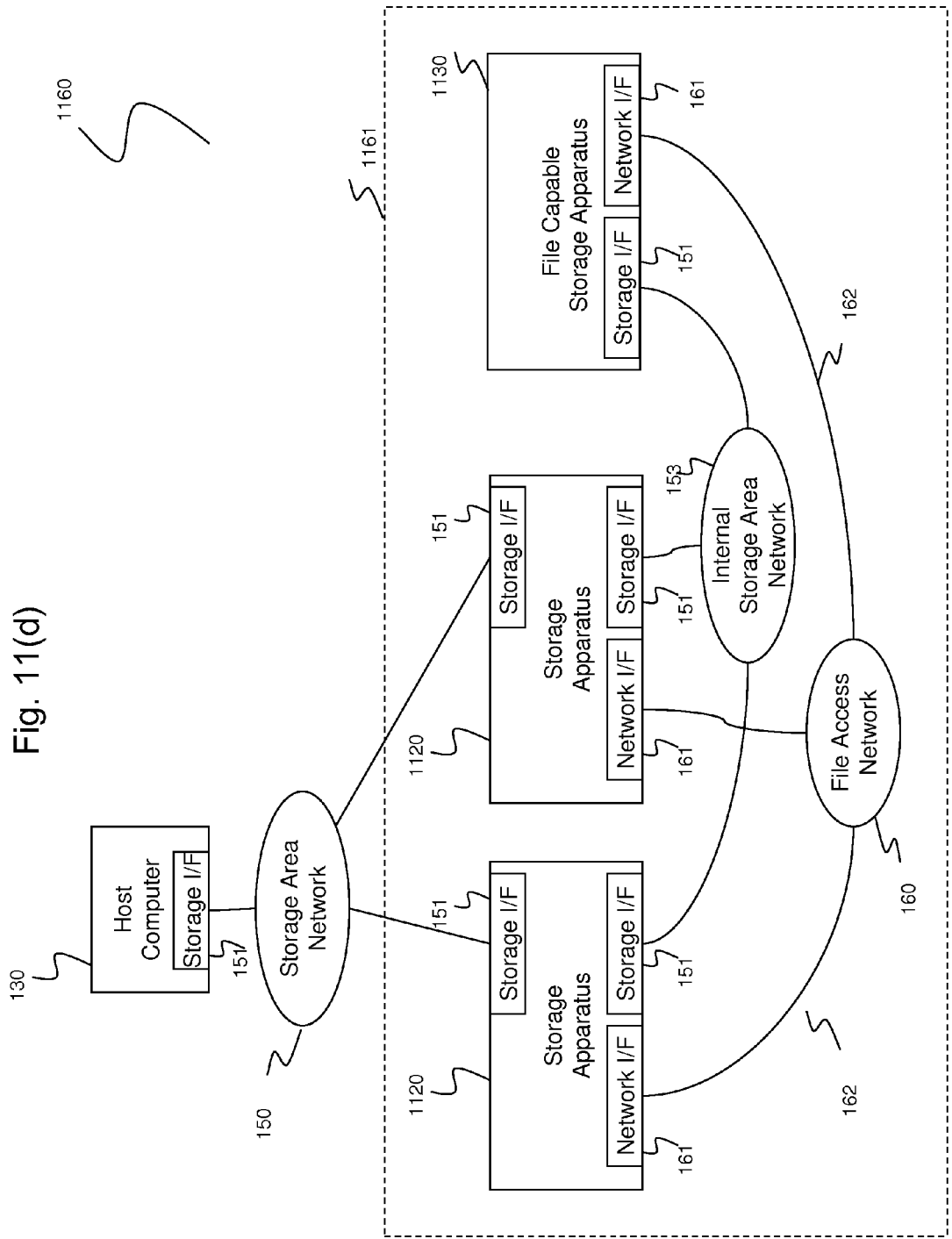
Figure 11E:
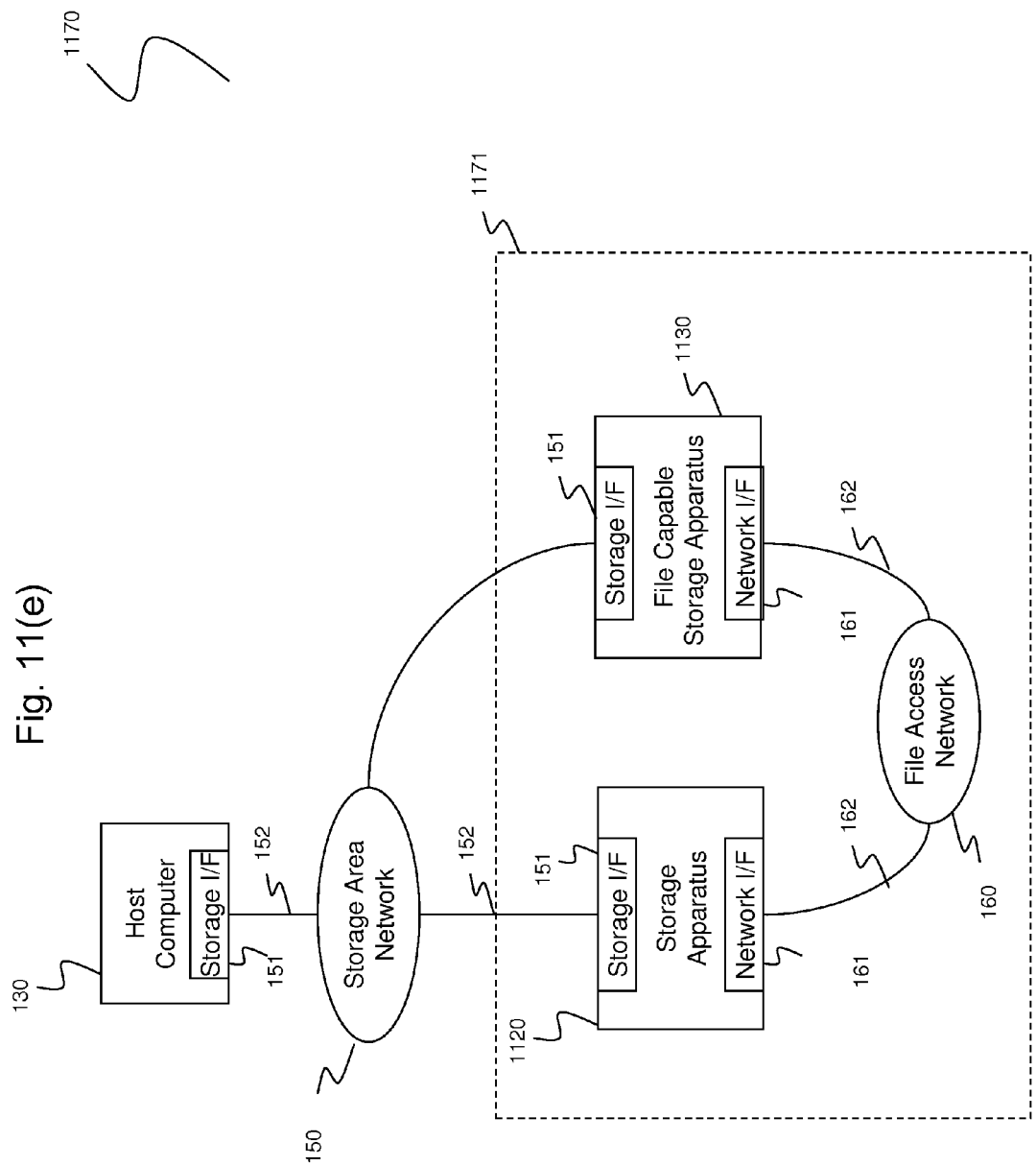
Figure 11F:
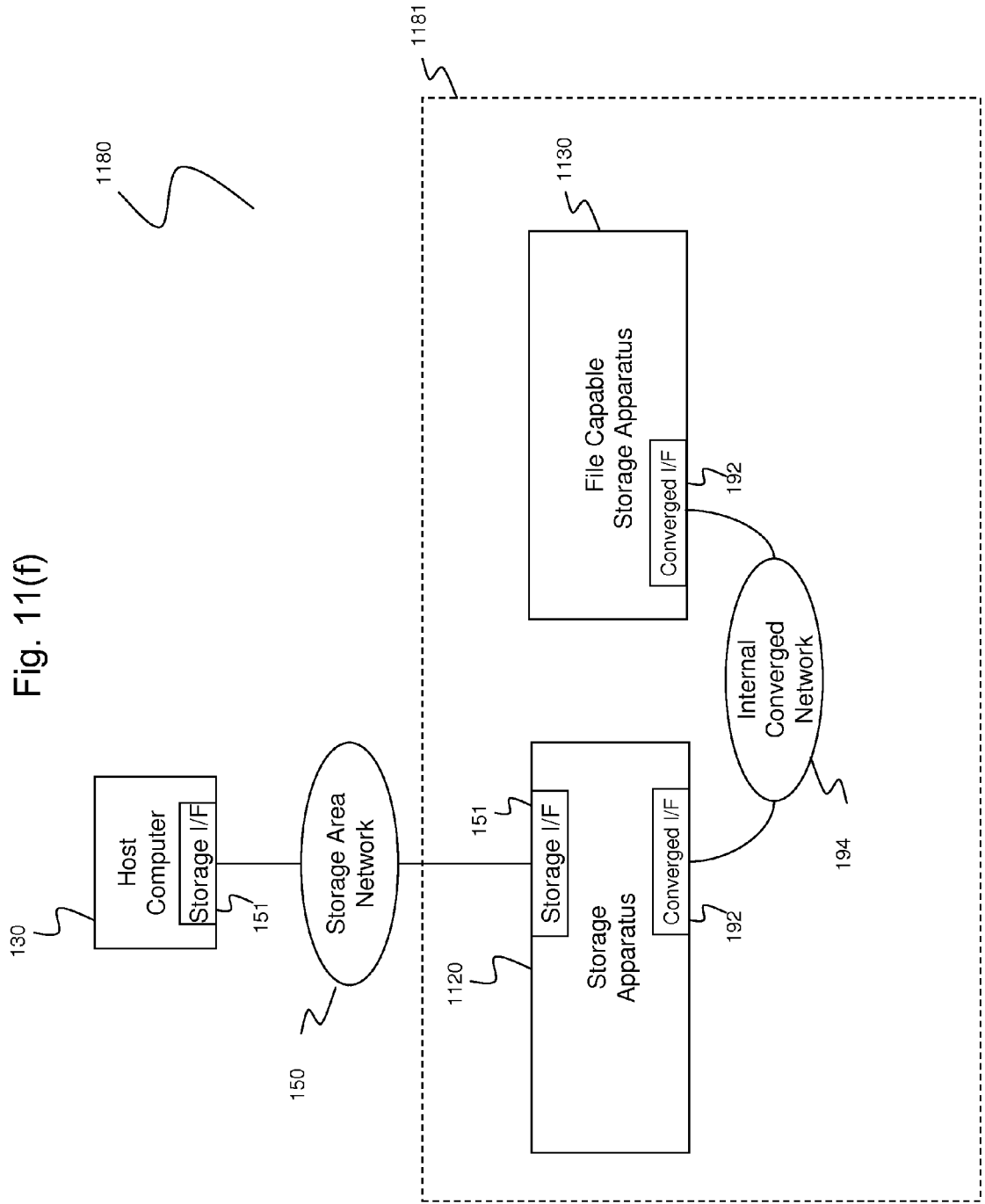
Figure 11G:
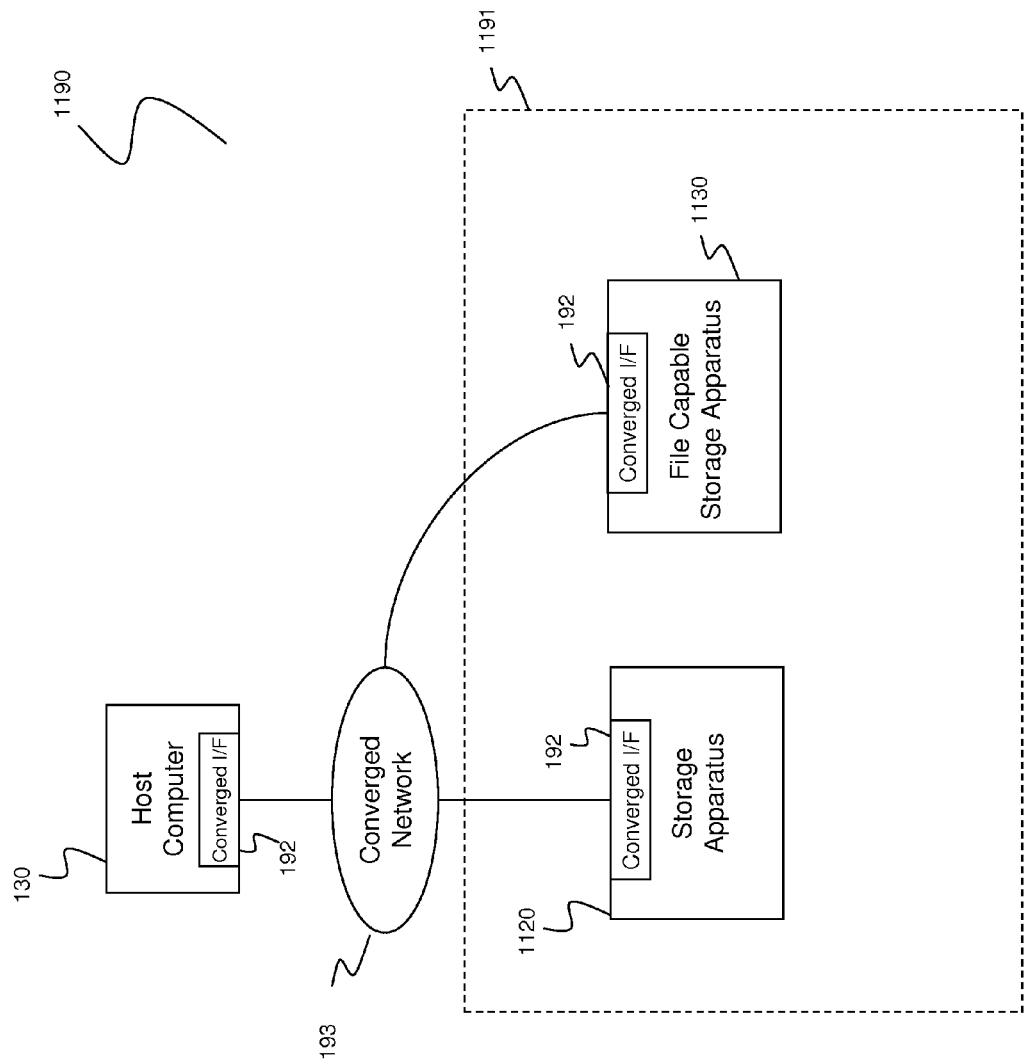

FIGS. 11a-11g illustrate an example of a third embodiment configuration of an information system in which the method and apparatus of the invention may be applied. As seen in FIG. 11a, the information system for the third embodiment includes a host computer 130, a storage area network 150, and a storage system 1110. The storage system 1110 includes at least one storage apparatus 1120 and a file capable storage apparatus 1130. The host computer 130 issues I/O requests to the storage apparatus 1120 using storage interfaces 151 via the SAN 150. Furthermore, the storage apparatus 1120 can issue a disk I/O request to the file capable storage apparatus 1130 via the internal SAN 153 and a file I/O request to the file capable storage apparatus 1130 via the file access network 160. As seen in FIG. 11b, the storage apparatus 1120 is almost the same as the storage apparatus 110 of the first embodiment, but some components are different from those of the storage apparatus 110. The storage apparatus 1120 has a page mapping program 1122, a page mapping table 1200, and a page migration program 1124 in its memory 1121.

As seen in FIG. 11c, the file capable storage apparatus 1130 has the storage interface 151 and network interfaces 161 so that it can process both disk I/O via the SAN 150 and file I/O via the file access network 162. The file capable storage apparatus 1130 has the disk I/O program 119 and disk cache 113 to process disk I/O and has the file system program 123, buffer cache 125, and network file process program 124 to process file I/O in the memory 1132. The file capable storage apparatus 1130 uses the storage media 117 both for raw I/O and file I/O as the storage apparatus 820 of the second embodiment does. Additionally, the file capable storage apparatus 1130 can have the page data copy program 1133, which copies data between the storage media 117. The file capable storage apparatus 1130 may have additional components, such as the page mapping program 1122, page mapping table 1200, page migration program 115, and page-filename mapping program 118 as provided in the storage apparatus 820 of the second embodiment.

For communication, the host computer 130 and the storage apparatus 1120 have storage interfaces 151. Using the storage interfaces 151, the host computer 130 and storage apparatus 1120 communicate for I/O via the SAN 150. As seen in FIG. 11a, the storage apparatus 1120 and the file capable storage apparatus 1130 communicate for I/O via an internal storage area network 153. There are common protocols for the storage interface 151 and the SAN 153 such as FC, iSCSI, FCoE, and so on. The storage apparatus 1120 and the file capable storage apparatus 1130 having network interfaces 161 can communicate and issue file I/O to the storage apparatus 1120 via the file access network 160. There are common protocols for file I/O interface via network like NFS (Network File System), CIFS (Common Internet File System), and AFP (Apple Filing Protocol). The storage apparatus 1120 also uses this network 160 to issue "page copy request" to the file capable storage apparatus 1130. The host computer 130 is the user of the storage system 1110. The host computer 130 issues I/O using the storage interface 151 via the SAN 150.

B. Network Topology Variation and Converged Network

FIGS. 11d-11g show other examples of the information system configuration 1160, 1170, 1180, and 1190 in which the method and apparatus of this invention may be applied. In the configuration 1160, there are a plurality of storage apparatus 1120 and each apparatus 1120 can issue a disk I/O request to the file capable storage apparatus 1130 via the internal SAN 153 and a file I/O request to the file capable storage apparatus 1130 via the file access network 160. In the information system configuration 1170, the SAN 150 and internal SAN 153 are unified and the SAN 150 is used both for disk I/Os between the host computer 130 and the storage apparatus 1120 and disk I/Os between the storage apparatus 1120 and the file capable storage apparatus 1130. In the information system configuration 1180, the storage apparatus 1120 and the file capable storage apparatus 1130 have converged interfaces 192 instead of storage interfaces 151 and network interfaces 161. The converged interface 192 and the internal converged network 194 can process both storage protocol and file I/O protocol in the same physical media. For example, FCoE, iSCSI, NFS, and CIFS are supported. Because the converged interfaces 192 and internal converged network 194 support both storage protocol and file I/O protocol, the following discussion for the information system configuration 1100 is also applicable for the information system configuration 1180. In the information system overview 1190, the SAN 150 and the internal converged network 194 are unified into the converged network 193 in addition to the information system configuration 1180. Because the converged interfaces 192 and converged network 193 support both storage protocol and file I/O protocol, the following discussion for the information system configuration 1100 is also applicable for the information system configuration 1190.

C. Page Mapping Table

FIG. 12 shows an example of the page mapping table 1200. The page mapping table 1200 describes the relationship between logical volumes that are accessible from the host computer 130, the storage media 117, and the file capable storage apparatus 1130. The page mapping table 1200 has combined columns of the page mapping tables 200 and 1000 of the first and second embodiments (FIGS. 2 and 10). That is to say, the page mapping table 1200 has both the node id column 1210 and "in file" column 1220. Using these columns 1210 and 1220, the page mapping table 1200 represents three locations of each data: (1) in internal storage media 117, (2) in external file capable storage apparatus 1130 and using disk I/O to access the data, and (3) in external file capable storage apparatus 1130 and using file I/O to access the data. Entries having "internal" in the node ID column 1210 show the case (1). Entries not having "internal" in the node ID column 1210 and having "no" in the "in file" column 1220 show case (2). Entries not having "internal" in the node ID column 1210 and having "yes" in the "in file" column 1220 show case (3).

D. I/O Mapping Method

Figure 13:
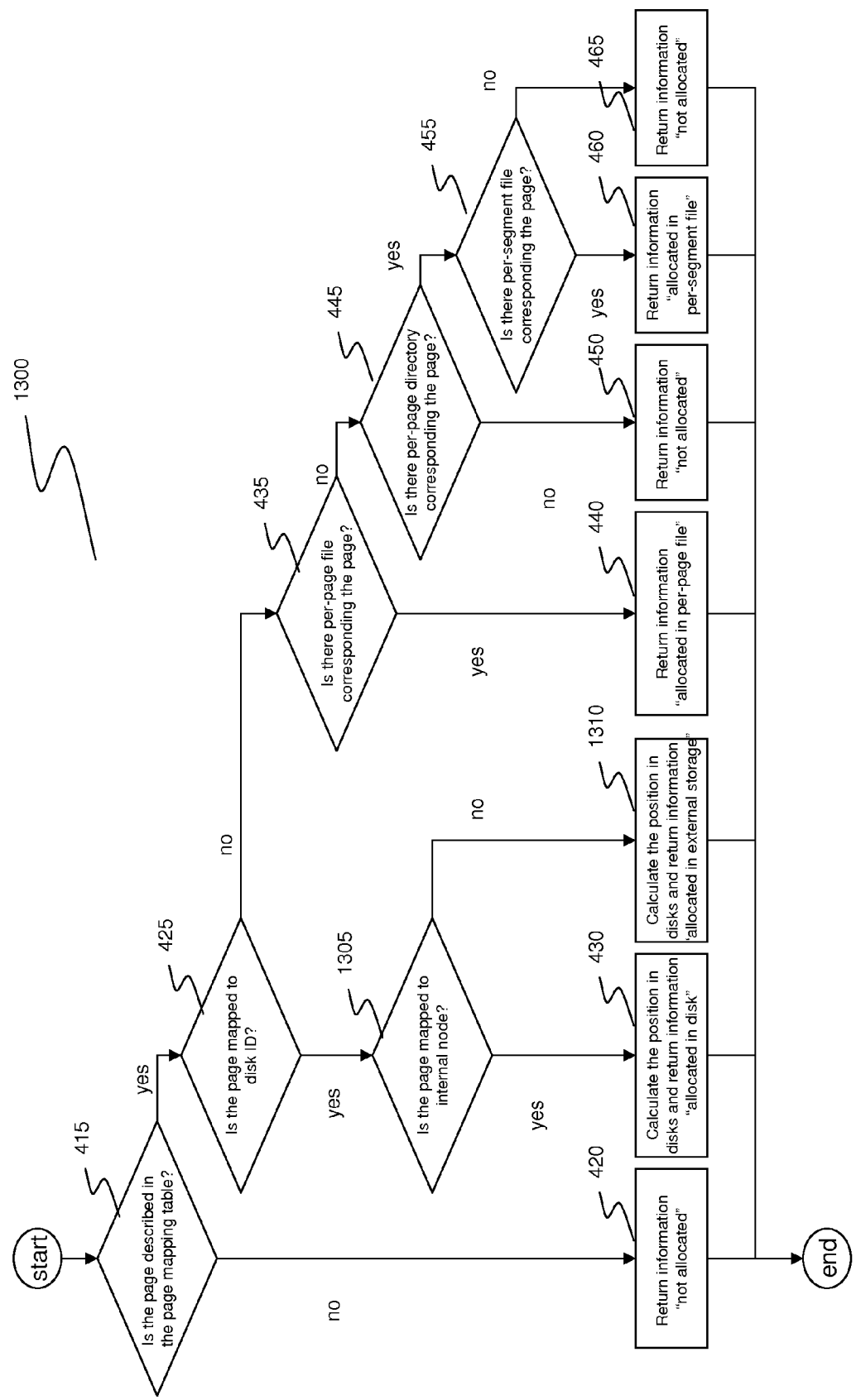
FIG. 13 shows an example of the I/O mapping process in the third embodiment.

When the disk I/O program 119 receives I/O requests from the host computer 130, the page mapping program 1112 and the page-filename mapping program 118 specify where to read/write by referring to the page mapping table 1200 and the file tree 300. FIG. 13 shows an example of the I/O mapping process 1300. The I/O mapping process 1300 is the same as the mapping process 400 of the first embodiment (FIG. 4) except for step 1305. If the page is not mapped to disk ID at step 425, the I/O mapping process 1300 executes step 1305.

At step 1305, the page mapping program 1112 checks if the target page is mapped to internal node by referring to the node ID column 1210 of the page mapping table 1200. When the page is mapped to internal node, the page mapping program 1112 executes step 430. When the page is mapped to external node, the page mapping program 1112 can calculate the position by the following formula: (requested page number in volume)−(page offset written in the page mapping table entry)+(disk offset written in the page mapping table entry) at step 1310.

After the I/O mapping process 1300, the page mapping program 1112 gets the location of the page. Using the page location information, the disk I/O program 119 can issue a disk I/O request to the internal storage media 117 or the file capable storage apparatus 1130. Alternatively, the disk I/O program 119 can issue a file I/O request to the file capable storage apparatus 1130 using the path name generated by the page-filename mapping program 118.

E. Page Migration and Mapping Conversion Method

When the system administrator specifies or some events occur, the page migration program 1124 executes page migrations. For example, when there is not much available volume in the storage media 117 or more I/O throughput is needed, migration is executed. During migration, I/O requests from the host computers 130 are being suspended. The page migration program 1124 executes some patterns of migrations.

Figure 14A:
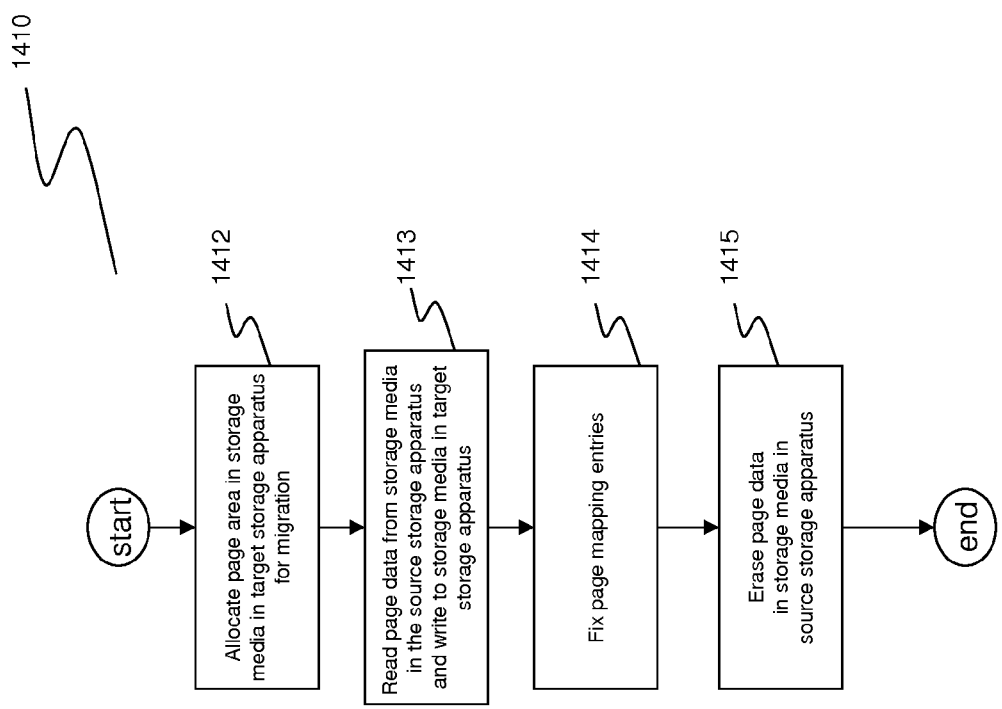
FIG. 14a shows an example of the migration flow to migrate page between the internal storage media and the storage media in external file storage apparatus.
Figure 15A:
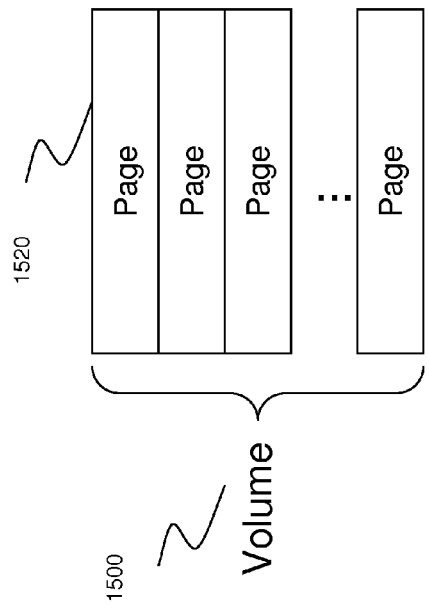
FIGS. 15a-15d illustrate the different levels of block size.
Figure 15B:
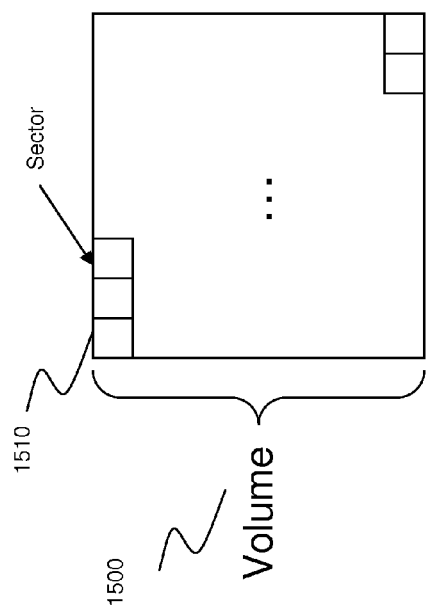
Figure 15C:
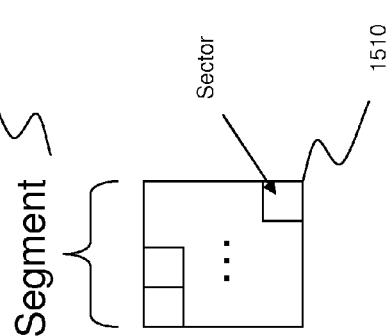
Figure 15D:
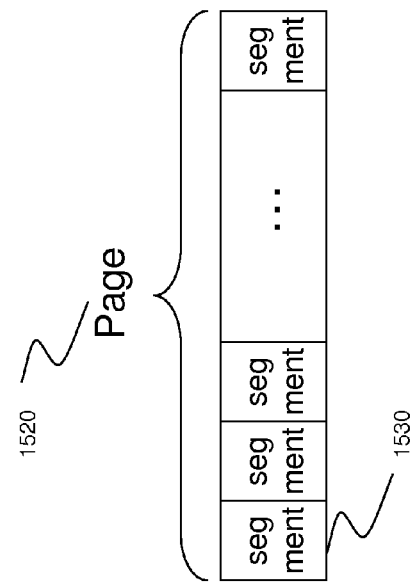

For migration between storage media in different storage apparatus, this migration method realizes the transition from location type (1) to location type (2), from location type (2) to location type (1), or from location type (2) to location type (2). FIG. 14a shows an example of the migration flow 1410 to migrate page between the internal storage media and the storage media in the external file storage apparatus. It is assumed that the page is migrated from the source storage apparatus to the target storage apparatus. At step 1412, the page migration program 1124 allocates page area in unused area of the storage media 117 of the target storage apparatus. At step 1413, the page migration program 1124 copies the page data in the storage media 117 in the source storage apparatus onto the storage media in the target storage apparatus. At step 1414, the page migration program 1124 fixes the entries of the page mapping table 1200 to specify the migrated page location. At step 1415, the page migration program 1124 erases the page data in the storage media of the source storage apparatus.

For migration from storage media to per-page file, this migration method realizes the transition from location type (2) to location type (3), or from location type (1) to location type (3). FIG. 14b shows an example of the migration flow 1430 to migrate page data from storage media in the source storage apparatus to per-page file on the file system in the source file capable storage apparatus. At step 1432, the page migration program 1124 checks if the page data copy program 1133 is available for this migration. If the target storage apparatus does not have the page data copy program 1133 at step 1432, the page data copy program 1133 is not available. When the page data copy program 1133 is not available, the page migration program 1124 reads page data from the storage media 117 in the source storage apparatus and writes onto the per-page file in the file system in the target file capable storage apparatus at step 1433. Then, the page migration program 1124 erases the page-data in the storage media 117 in the source storage apparatus at step 1434. At steps 1433 and 1434, the page data must move on the SAN 150 and file access network 160, so that the storage apparatus 120 consumes the CPU time and the bandwidth of the storage interface 151 and the network interface 161. If the page data copy program 1133 is available, the storage apparatus can delegate the page data copy process to the target file capable storage apparatus 1130. Then, at step 1435, the page migration program 1124 issues a page copy request to the target file capable storage apparatus via the file access network 160. At step 1436, the page data copy program 1133 in the target file capable storage apparatus 1130 receives the page copy request, reads the page data from the storage media 117, writes onto the per-page file, and erases the page data from storage media 117 in the target the target file capable storage apparatus 1130. Using the page copy request and the page data copy program 1133, the page data is processed internally in the target file capable storage apparatus 1130, and the storage apparatus 1120 does not consume the CPU time and the bandwidth. After step 1434 or 1436, the page migration program 1124 fixes the entries of the page mapping table 1200 to specify the migrated page location at step 1437.

For migration from per-page file to storage media to file system, this migration method realizes the transition from location type (3) to location type (2), or from location type (3) to location type (1). FIG. 14c shows an example of the migration flow 1450 to migrate page data from per-page file on the file system in the source file capable storage apparatus to the storage media in the target storage apparatus. At step 1451, the page migration program 1124 allocates page area in the unused area of the storage media 117 of the target storage apparatus. At step 1453, the page migration program 1124 checks if the page data copy program 1133 is available for this migration. If the target storage apparatus does not have the page data copy program 1133 at step 1453, the page data copy program 1133 is not available. When the page data copy program 1133 is not available, the page migration program 1124 reads page data from per-page file in the source file capable storage apparatus 1130 and writes onto the storage media 117 in the target storage apparatus at step 1454. At steps 1454 and 1455, if the page migration program 1124 cannot find the per-page file, the page migration program 1124 regards that the per-page file was filled with 0s and was shrunk or omitted, and writes 0s to the storage media 117. Then, the page migration program 1124 erases the per-page file in file system in the source file capable storage apparatus 1130 at step 1455. At steps 1454 and 1455, the page data must move on the SAN 150 and file access network 160, so that the storage apparatus 120 consumes the CPU time and the bandwidth of the storage interface 151 and the network interface 161. If the page data copy program 1133 is available, the storage apparatus can delegate the page data copy process to the target file capable storage apparatus 1130. Then, at step 1456, the page migration program 1124 issues a page copy request to the target file capable storage apparatus via the file access network 160. At step 1457, the page data copy program 1133 in the target file capable storage apparatus 1130 receives the page copy request, reads the per-page file from the file system, writes onto the storage media 117, and erases the per-page file from the file system in the target the target file capable storage apparatus 1130. At steps 1456 and 1457, if the page data copy program 1133 cannot find the per-page file, the page data copy program 1133 regards that the per-page file was filled with 0s and was shrunk or omitted, and writes 0s to the storage media 117. At step 1457, using the page copy request and the page data copy program 1133, the page data is processed internally in the target file capable storage apparatus 1130, and the storage apparatus 1120 does not consume the CPU time and the bandwidth. After step 1434 or 1436, the page migration program 1124 fixes the entries of the page mapping table 1200 to specify the migrated page location at step 1458.

For migration from per-page file to per-segment file, the migration flow 530 shown in the first embodiment (FIG. 5c) is also applicable.

For migration from per-segment file to per-page file, the migration flow 530 shown in first embodiment (FIG. 5c) is also applicable.

After each migration, suspended I/O requests are resumed.

Using the above methods, the storage system 1110 enables to locate and migrate chunk data in three states: (1) storage media in the storage apparatus 1120, (2) storage media in the external file capable storage 1130, (3) per-page file in the external file capable storage 1130. Furthermore, the methods enable split page data to per-segment files and the de-duplication method will run effectively. In the information system configuration 1160 (FIG. 11d), the de-duplication over files of different storage apparatus 1120 stored can be applied. For de-duplication, the methods such as that disclosed in US2009/0132619 are acceptable. The per-file hierarchical storage management methods such as that disclosed in U.S. Pat. No. 7,330,950 are also applicable, and the per-file hierarchical storage management methods enable to store some per-page files and per-segment files in cheaper storage media.

According to specific embodiments of the invention based on the features described above, a system of this invention includes one or more host computers, storage apparatus, and file servers (or file capable storage apparatus or internal file systems). The storage apparatus has the capability to allocate chunks from a chunk pool to logical data volumes, has the interface to access the file servers and create file systems on internal storage media. Each chunk has fixed size called "page." The storage system has the page mapping table to make the connection between a page of data volumes and a file stored on file servers. The storage system also has the page-filename mapping program that is the kind of program that inter-converts the page location between the data volume and the filename. The storage system can store page data in file servers using these tables and units. Furthermore, the storage system can split a page of data into smaller files and store them in file servers. When the page-filename mapping program names files in a regular manner, the storage system does not need to make the page mapping table larger. Still, the split files are smaller than the size of each page.

The storage system may have TSM (Tiered Storage Management) capability with the table and units mentioned above. This invention can be applied with the TSM capability. The storage system capable of TSM and having the page mapping table and the page-filename mapping program constructs a chunk pool with some kind of storage media in the storage system and some file servers. The storage system can allocate pages which are mixture of storage media and external file servers to one logical volume. The storage system having the file system program can store pages not only onto raw volumes directly but also onto internal file systems as files. In this situation, the storage system stores pages that are often accessed onto the fast raw media and split and store chunks that are hardly accessed onto the (not fast) file system.

Of course, the system configurations illustrated in FIGS. 1, 8, and 11 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for controlling the chunk allocation to each data volume in a storage system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. In an information system that includes a host computer which issues an I/O request to a storage system, the storage system comprising:
   a storage apparatus which includes a processor, a plurality of storage disks, and a memory storing a page mapping table, a page mapping program, and a page-filename mapping program; and
   a file system which manages a file tree of files with filenames;
   wherein the page mapping table specifies a relationship between data volumes in the storage apparatus that are accessible from the host computer and the storage disks and the file system, the data volumes each including a plurality of pages, each page including a plurality of segments, each segment including a plurality of sectors;
   wherein the file tree has for each storage apparatus a hierarchy of directories and files based on relationships among the data volumes, the pages, and the segments;
   wherein the page mapping program and the page-filename mapping program are executable by the processor to specify, by page, a location of data contained in the I/O request by referring to the page mapping table and the file tree.

2. The storage system of claim 1, which comprises a plurality of storage apparatuses and a file server, wherein the file system is provided in the file server, and wherein the file server is connected to the storage apparatuses via a file access network for file I/O.

3. The storage system of claim 1, further comprising:
   a file server in which the file system is provided;
   wherein the storage apparatus and the file server each include a converged interface to be coupled to a converged network for processing both storage protocol and file I/O protocol.

4. The storage system of claim 1,
   wherein the file system is provided in the storage apparatus which has file service capability.

5. The storage system of claim 4,
   wherein the page mapping table specifies at least one row of entries for each data volume with a volume identifier in the storage apparatus, each row of entries associated with a successive group of pages for the volume identifier, each row of entries including a page offset indicating an offset of data volumes, a length indicating a length of the group of pages in the row, and one of
   (a) a "yes" entry for "in file" indicating that the group of pages in the row is located in the file system, or
   (b) a disk identifier identifying a storage disk to place page data, and a disk offset indicating an offset of the storage disk for the group of pages of the row.

6. The storage system of claim 1, further comprising:
   a file capable storage apparatus in which the file system is provided, the file capable storage apparatus being coupled to the storage apparatus via an internal storage area network for disk I/O and via a file access network for file I/O.

7. The storage system of claim 6, which comprises a plurality of storage apparatuses each coupled to the file capable storage apparatus via the internal storage area network for disk I/O and via the file access network for file I/O.

8. The storage system of claim 6,
   wherein the page mapping table specifies at least one row of entries for each data volume with a volume identifier in the storage apparatus, each row of entries associated with a successive group of pages for the volume identifier, each row of entries including a page offset indicating an offset of data volumes, a length indicating a length of the group of pages in the row, and one of
   (a) a node identifier of "internal" indicating to place page data in a storage disk in the storage apparatus, a disk identifier identifying a storage disk in the storage apparatus to place the page data, and a disk offset indicating an offset of the storage disk for the group of pages of the row; or
   (b) a node identifier identifying the file capable storage apparatus to place page data, and one of (i) a "yes" entry for "in file" indicating that the group of pages in the row is located in the file system of the file capable storage apparatus or (ii) a "no" entry for "in file" indicating that the group of pages in the row is located in a storage disk in the file capable storage apparatus, a disk identifier identifying the storage disk in the file capable storage apparatus to place page data, and a disk offset indicating an offset of the storage disk for the group of pages of the row.

9. The storage system of claim 1, further comprising:
a file capable storage apparatus in which the file system is provided, the file capable storage apparatus being coupled to the storage apparatus via a file access network for file I/O;
wherein the storage apparatus and the file capable storage apparatus each have a storage interface for disk I/O with the host computer.

10. The storage system of claim 1,
wherein the page mapping table specifies at least one row of entries for each data volume with a volume identifier in the storage apparatus, each row of entries associated with a successive group of pages for the volume identifier, each row of entries including a page offset indicating an offset of data volumes, a length indicating a length of the group of pages in the row, and one of
(a) a node identifier identifying the file server to place page data, or
(b) a disk identifier identifying a storage disk in the storage apparatus to place page data, and a disk offset indicating an offset of the storage disk for the group of pages of the row.

11. The storage system of claim 1,
wherein the file tree has for each storage apparatus a per-storage directory, a plurality of per-volume directories under each per-storage directory, at least one per-page file under one or more of the per-volume directories, at least one per-page directory under one or more of the per-volume directories, and a plurality of per-segment files under each of the at least one per-page directory.

12. In an information system that includes a host computer which issues an I/O request to a storage system, the storage system having a storage apparatus which includes a processor, a plurality of storage disks, and a memory storing a page mapping table; and a file system which manages a file tree of files with filenames; wherein the page mapping table specifies a relationship between data volumes in the storage apparatus that are accessible from the host computer and the storage disks and the file system; wherein the file tree has for each storage apparatus a per-storage directory, a plurality of per-volume directories under each per-storage directory, at least one per-page file under one or more of the per-volume directories, at least one per-page directory under one or more of the per-volume directories, and a plurality of per-segment files under each of the at least one per-page directory; a method of specifying a location of data contained in the I/O request by referring to the page mapping table and the file tree, the method comprising, for each target page of the data contained in the I/O request:
determining whether the target page is described in the page mapping table; if not, returning "page not allocated" information; if yes, then,
determining whether the target page is mapped to the storage disks as described in the page mapping table; if yes, calculating a position in the storage disks and returning "allocated in disk" information with the calculated position; if no, then,
determining whether the target page corresponds to a per-page file in the file system by referring to the file tree; if yes, returning "allocated in per-page file" information with a filename of the per-page file; if no, then
determining whether the target page corresponds to a per-page directory in the file system by referring to the file tree; if no, returning "page not allocated" information; if yes, then
determining whether the target page corresponds to a per-segment file in the file system by referring to the file tree; if yes, returning "allocated in per-segment file" information with a filename of the per-segment file; if no, then returning "segment not allocated" information.

13. The method of claim 12, wherein the storage system further includes a file capable storage apparatus in which the file system is provided, the file capable storage apparatus being coupled to the storage apparatus, the method further comprising:
in determining whether the target page is mapped to the storage disks as described in the page mapping table, if yes, calculating a position in the storage disks of the storage apparatus and returning "allocated in disk" information with the calculated position only if the target page is mapped to an internal node of the storage apparatus, but if the target page is not mapped to an internal node of the storage apparatus, then calculating a position in the storage disks of the file capable storage apparatus and returning "allocated in external storage" information with the calculated position.

14. The method of claim 13, wherein one of the storage apparatus and the file capable storage apparatus is a source storage apparatus and another one of the storage apparatus and the file capable storage media is a target storage apparatus, the method further comprising:
allocating a page area in an unused area of a storage disk of the target storage apparatus;
copying page data in the storage disk in the source storage apparatus onto the storage disk in the target storage apparatus to migrate a page;
fixing the entries of the page mapping table to specify location of the migrated page; and
erasing the page data in the storage disk of the source storage apparatus.

15. The method of claim 13, wherein one of the file capable storage apparatus or the storage apparatus is a source storage apparatus and the file capable storage apparatus is a target storage apparatus, the method further comprising:
if the target storage apparatus does not have a page data copy program to copy data from the source storage apparatus to the target storage apparatus, then reading page data from a storage disk in the source storage apparatus and writing the page data to a page file of the target storage apparatus, and erasing the page data from the storage disk in the source storage apparatus; and
if the target storage apparatus has a page data copy program to copy data from the source storage apparatus to the target storage apparatus, then issuing a page data copy request to the target storage apparatus and copying page data internally from a storage disk of the target storage apparatus to a page file in the file system of the target storage apparatus and erasing the page data from the storage disk of the target storage apparatus.

16. The method of claim 13, wherein the file capable storage apparatus is a source storage apparatus and one of the file capable storage apparatus or the storage apparatus is a target storage apparatus, the method further comprising:
allocating a page area in an unused area of a storage disk of the target storage apparatus;

if the target storage apparatus does not have a page data copy program to copy data from the source storage apparatus to the target storage apparatus, then reading page data from a per-page file in the file system of the source storage apparatus and writing the page data to the storage disk of the target storage apparatus, and deleting the per-page file from the file system of the source storage apparatus; and if the target storage apparatus has a page data copy program to copy data from the source storage apparatus to the target storage apparatus, then issuing a page data copy request to the target storage apparatus and copying page data internally from a per-page file in the file system of the target storage apparatus to the storage disk of the target storage apparatus and deleting the per-page file from the file system of the target storage apparatus.

17. The method of claim 12, wherein the storage system further includes a file server in which the file system is provided, the file server being coupled to the storage apparatus; the method further comprising:

copying target page data of the target page in a storage disk of the storage apparatus to a file in the file server in which the file system is provided;

modifying the page mapping table to specify that the target page is located in the file server; and erasing the page data of the target page in the storage disk of the storage apparatus.

18. The method of claim 12, wherein the storage system further includes a file server in which the file system is provided, the file server being coupled to the storage apparatus; the method further comprising:

allocating an unused page area from a storage disk of the storage apparatus by referring to the page mapping table;

copying data in a per-page file in the file server to the allocated page area for migrating a page;

modifying the page mapping table to specify that the migrated page is located in the storage disk of the storage apparatus; and deleting the per-page file in the file server.

19. The method of claim 12, the method further comprising:

making a new per-page directory;

creating per-segment files in the new per-page directory;

copying data in a per-page file to the created per-segment files; and deleting the per-page file.

20. The method of claim 12, the method further comprising:

concatenating per-segment files to a per-page file; and if any per-segment file does not exist, filling a corresponding area in the per-page file with zeroes.

* * * * *